US009141585B2

(12) United States Patent
Conti

(10) Patent No.: US 9,141,585 B2
(45) Date of Patent: *Sep. 22, 2015

(54) APPARATUS AND METHOD FOR SINGLE UNIT ACCESS DISPLAY

(71) Applicant: CheckPoint Systems, Inc., Thorofare, NJ (US)

(72) Inventor: Brian V. Conti, Matthews, NC (US)

(73) Assignee: Checkpoint Systems, Inc., Thorofare, NJ (US)

( * ) Notice: Subject to any disclaimer, the term of this patent is extended or adjusted under 35 U.S.C. 154(b) by 258 days.

This patent is subject to a terminal disclaimer.

(21) Appl. No.: 13/851,496

(22) Filed: Mar. 27, 2013

(65) Prior Publication Data
US 2013/0211584 A1    Aug. 15, 2013

Related U.S. Application Data

(63) Continuation of application No. 12/478,589, filed on Jun. 4, 2009, now Pat. No. 8,428,774.

(51) Int. Cl.
*G06F 17/00* (2006.01)
*G06F 3/14* (2006.01)
*G07F 9/02* (2006.01)

(52) U.S. Cl.
CPC .............. *G06F 17/00* (2013.01); *G06F 3/1423* (2013.01); *G07F 9/026* (2013.01); *G09G 2380/04* (2013.01)

(58) Field of Classification Search
CPC ...................................................... G07F 9/026
USPC .................... 700/236; 221/2, 3, 7, 15, 281
See application file for complete search history.

(56) References Cited

U.S. PATENT DOCUMENTS

| 4,007,853 A | 2/1977 | Bahneman |
| 4,037,756 A | 7/1977 | Jaquish |
| 4,106,668 A | 8/1978 | Gebhardt et al. |
| 4,209,108 A | 6/1980 | Winans |
| 4,887,737 A | 12/1989 | Adenau |
| 5,263,596 A | 11/1993 | Williams |
| 5,363,984 A | 11/1994 | Laird, III |
| 5,407,094 A | 4/1995 | Vajtay |
| 5,553,720 A | 9/1996 | Dardashti |
| 5,646,912 A | 7/1997 | Cousin |
| 5,730,320 A | 3/1998 | David |
| 5,794,817 A | 8/1998 | Rosa |

(Continued)

FOREIGN PATENT DOCUMENTS

| EP | 1579789 | 9/2005 |
| WO | WO 2009/021014 | 2/2009 |

*Primary Examiner* — Timothy Waggoner

(57) ABSTRACT

A product display apparatus including a product supply module that includes a support frame and defines a storage area. A door assembly coupled to the support frame is structured to provide bulk access to the storage area in an open position and prevent bulk access to the storage area in the closed position. A return area is defined between the support frame and the top of the door assembly while a retrieval area is defined between the support frame and the bottom of the door assembly. A modular display portion is coupled to the door assembly that extends into the retrieval area to define a single unit retrieval opening. A load block member may be disposed in the retrieval area to permit retrieval of a product, but inhibit return of a product. A retrieval detector may be configured to detect when a product has been withdrawn through the retrieval area and generate an alert upon detection of rapid product removal.

21 Claims, 16 Drawing Sheets

(56) References Cited

U.S. PATENT DOCUMENTS

| | | | |
|---|---|---|---|
| 5,806,278 A | 9/1998 | Shelledy | |
| 5,927,540 A | 7/1999 | Godlewski | |
| 6,176,558 B1 | 1/2001 | Hlade et al. | |
| 6,749,071 B2 | 6/2004 | Caterinacci | |
| 6,771,174 B2 | 8/2004 | Broas | |
| 7,017,778 B2 | 3/2006 | Halbherr | |
| 7,150,365 B2 | 12/2006 | Hardy et al. | |
| 7,184,857 B1 | 2/2007 | Hertz et al. | |
| 7,299,934 B2 | 11/2007 | Hardy et al. | |
| 7,340,419 B2 | 3/2008 | Walker et al. | |
| 7,451,892 B2 | 11/2008 | Walker et al. | |
| 7,469,791 B2 | 12/2008 | Phoy | |
| 7,497,341 B2 | 3/2009 | Hardy et al. | |
| 7,641,072 B1 | 1/2010 | Vlastakis et al. | |
| 7,661,545 B2 | 2/2010 | Hardy et al. | |
| 7,792,711 B2 * | 9/2010 | Swafford et al. | 705/28 |

* cited by examiner

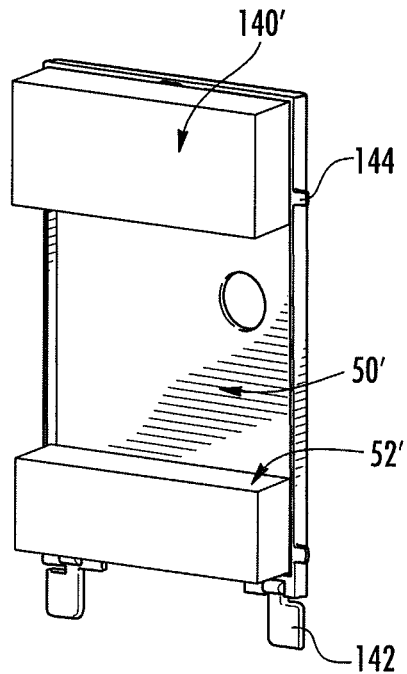
FIG. 5
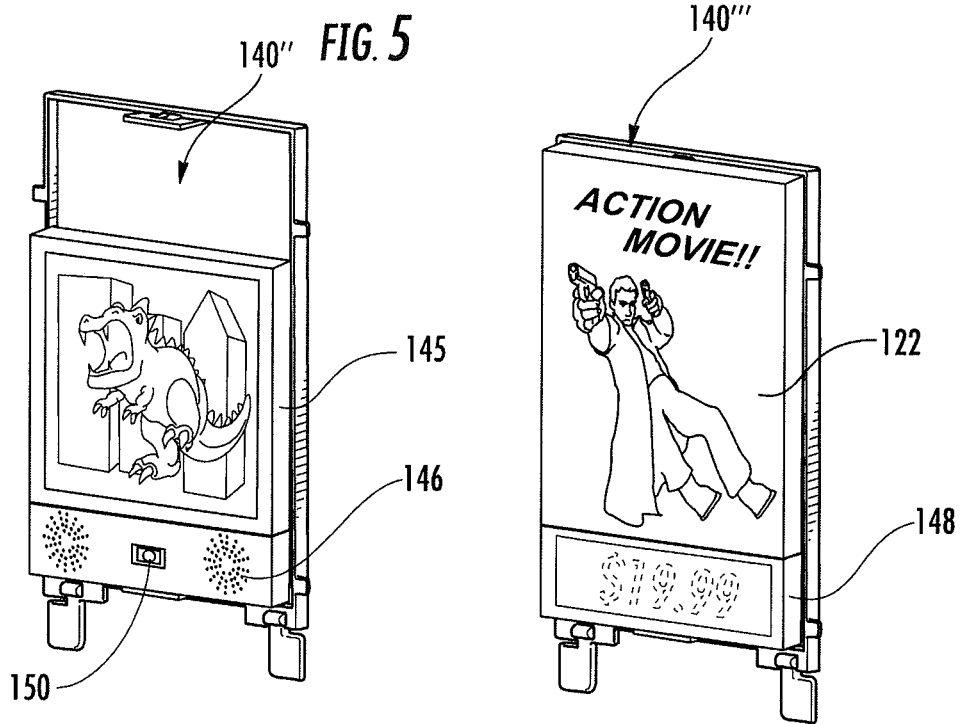
FIG. 6
FIG. 7

APPARATUS AND METHOD FOR SINGLE UNIT ACCESS DISPLAY

CROSS-REFERENCE TO RELATED APPLICATIONS

This application is a continuation of U.S. patent application Ser. No. 12/478,589, filed on Jun. 4, 2009, issued as U.S. Pat. No. 8,428,774, and is herein incorporated by reference in its entirety.

FIELD OF THE INVENTION

Embodiments of the present invention generally relate to product displays and, more particularly, to a product display apparatus that is structured to store and dispense displayed products in a controlled manner.

BACKGROUND OF THE INVENTION

Product display apparatuses or "product displays" are used to showcase products for sale and to entice customers to purchase the products. Product displays may be used to store new, high-priced, high-margin, or high-volume products and may be located near high-traffic customer pathways such as a store entrance or along a main aisle.

Applicant has identified a number of deficiencies and problems associated with the manufacture, operation, use, and monitoring of product displays. Through applied effort, ingenuity, and innovation, Applicant has solved many of these identified problems by developing a solution that is embodied by the present invention, which is described in detail below.

BRIEF SUMMARY OF THE INVENTION

Various embodiments of the invention are directed to a product display, and an associated system, that reduces or eliminates retail theft, and has a modular, easy to use, and aesthetically pleasing design. The product display can be housed within a shelf, a wall cavity, or in a mobile cart. The product display may be used individually or in combination with several other similar or differently configured product displays.

Product displays structured in accordance with various embodiments of the invention may be configured to store and display products such as DVDs, video games, CDs, computer software, cosmetics, fragrances, or other items that may be the subject of retail theft. As described in detail below, product displays structured in accordance with the present invention may be customized or adjusted to fit the size, shape, and profile of the product selected for display. The term profile, as used herein is defined to include a shape that corresponds to a side of a product or the shape of an aperture that permits a single product to pass through the aperture in a specific insertion alignment.

In one embodiment, the product display includes a product supply module that defines a storage area for holding a supply of products. A support frame at least partially defines a bulk access opening that provides bulk access to the product supply module. A door assembly is coupled to the support frame and structured to provide bulk access to the storage area through the bulk access opening in an open position and to prevent bulk access to the storage area in a closed position. The product display defines a return area between the door assembly and the support frame proximate a first side of the door assembly. The product display defines a retrieval area between the door assembly and the support frame proximate a second side of the door assembly. Finally, a modular display portion may be coupled to the door assembly, wherein the modular display portion extends at least partially into the retrieval area to define a single unit retrieval opening.

In some embodiments, the modular display portion is structured for adjustment between a first configuration and a second configuration. In the first configuration, the modular display portion extends at least partially into the retrieval area to define a first single unit retrieval opening. In the second configuration, the modular display portion extends at least partially into the retrieval area to define a second single unit retrieval opening.

Some embodiments may include a second modular display portion that is structured for coupling to the door assembly in place of the modular display portion such that the second modular display portion extends at least partially into the retrieval area to define a second single unit retrieval opening. The second single unit retrieval opening may define a different profile than the single unit retrieval opening.

Embodiments may include a modular display portion that extends at least partially into the return area to define a single unit return opening. A second modular display portion may be included that is structured for coupling to the door assembly in place of the modular display portion such that the second modular display portion extends at least partially into the return area to define a second single unit return opening. The second single unit return opening may define a different profile than the single unit return opening.

In still other embodiments, the door assembly may define a display cavity configured to present a product for protected viewing by a customer, i.e., the product may be viewed, but not handled by the customer. The door assembly may comprise a lock structured to secure the door assembly in the closed position. In some embodiments, the lock may be configured to be unlocked using a magnetic key.

Embodiments of a product display may include a retrieval detector positioned proximate the single unit retrieval opening and configured to generate a retrieval output in response to a product being withdrawn from the single unit retrieval opening. A processor may be disposed in communication with the retrieval detector and configured to receive the retrieval output. The processor may be further configured to determine a frequency associated with the receipt of the retrieval output and to generate an alert upon the frequency exceeding a predetermined value. The processor may initiate a timer and a counter upon receiving the retrieval output. In one embodiment, the processor increments the counter upon receipt of a second retrieval output, a third retrieval output, and so on, such that if the counter is incremented to reach a predetermined value before the timer reaches a time-out value, the processor generates an alert. In still another embodiment, the retrieval detector may be configured to generate a storage output when the storage area is empty.

Product displays structured in accordance with embodiments discussed herein may also include a return detector positioned proximate the single unit return opening and configured to generate a return output in response to a product being returned through the single unit return opening. A processor may be disposed in communication with the retrieval detector and the return detector and may be configured to receive the retrieval output and the return output. The processor may initiate a timer and a counter upon receiving the retrieval output and may increment the counter upon receipt of a second retrieval output, a third retrieval output, and so on. If the counter reaches a predetermined value before the timer reaches a time-out value, the processor may generate an alert.

In some embodiments, the processor decrements the counter upon receipt of the return output.

Product display embodiments may include a load block member disposed in the retrieval area that is configured to define a blocked position and a retrieval position. The load block member is driven from the blocked position to the retrieval position by a user grasping the product within the storage area of the product display and withdrawing the product through the retrieval area. A second load block member may be disposed in the retrieval area that is independently moveable relative to the first load block member. In some embodiments, the load block member may be disposed proximate a first side of the retrieval area and the second load block member may be disposed proximate a second side of the retrieval area wherein an access port is defined between the load block member and the second load block member for allowing the user to grasp the product within the storage area.

The load block member may be coupled to the door assembly by a hinge and the load block member may rotate from the blocked position to the retrieval position about the hinge. The load block member may be biased toward the blocked position. Notably, load block members structured according to various embodiments are configured to allow the user to grasp the product within the storage area in the blocked position and also to prevent return of a retrieved product through the retrieval area in the blocked position.

Another embodiment is directed to a method of generating an alert including the steps of detecting withdrawal of a product from the storage area through the single unit retrieval opening, initiating a timer to proceed to a time-out value in response to detecting the withdrawal of the product, detecting withdrawal of a second product from the storage area through the single unit retrieval opening, incrementing a counter in response to detecting the withdrawal of the second product, and signaling an alert upon the counter reaching a predetermined value prior to the timer reaching the time-out value. The steps for generating an alert may further include detecting the return of a product to the storage area through the return area and decrementing the counter in response to detecting return of the product to the storage area.

In some embodiments, the timer may be terminated when the counter is decremented to zero. In other embodiments, the alert may include an audible alarm, may activate a recording device to begin recording, or may bookmark a recording already in progress to identify points of activity associated with the display apparatus.

Product displays structured in accordance with other embodiments may include a processor that is configured to detect a number of products removed from the storage area through the single unit retrieval opening within a monitor period. The processor may further detect a number of products returned to the storage area through the return area within the monitor period, subtract the number of products returned from the number of products removed to determine a product count, and generate an alert upon the product count reaching a predetermined value. The processor may also set the product count to zero upon termination of the monitor period.

In some embodiments, the processor may be configured to monitor a second monitor period that at least partially overlaps the first monitor period. The processor may also be configured to activate a recording device to record activity associated with the display apparatus in response to the alert. The processor may be configured to identify portions of a memory associated with a recording device in response to the alert. Finally, the processor may be configured to activate an alarm in response to the alert.

BRIEF DESCRIPTION OF THE SEVERAL VIEWS OF THE DRAWINGS

Figure 1:
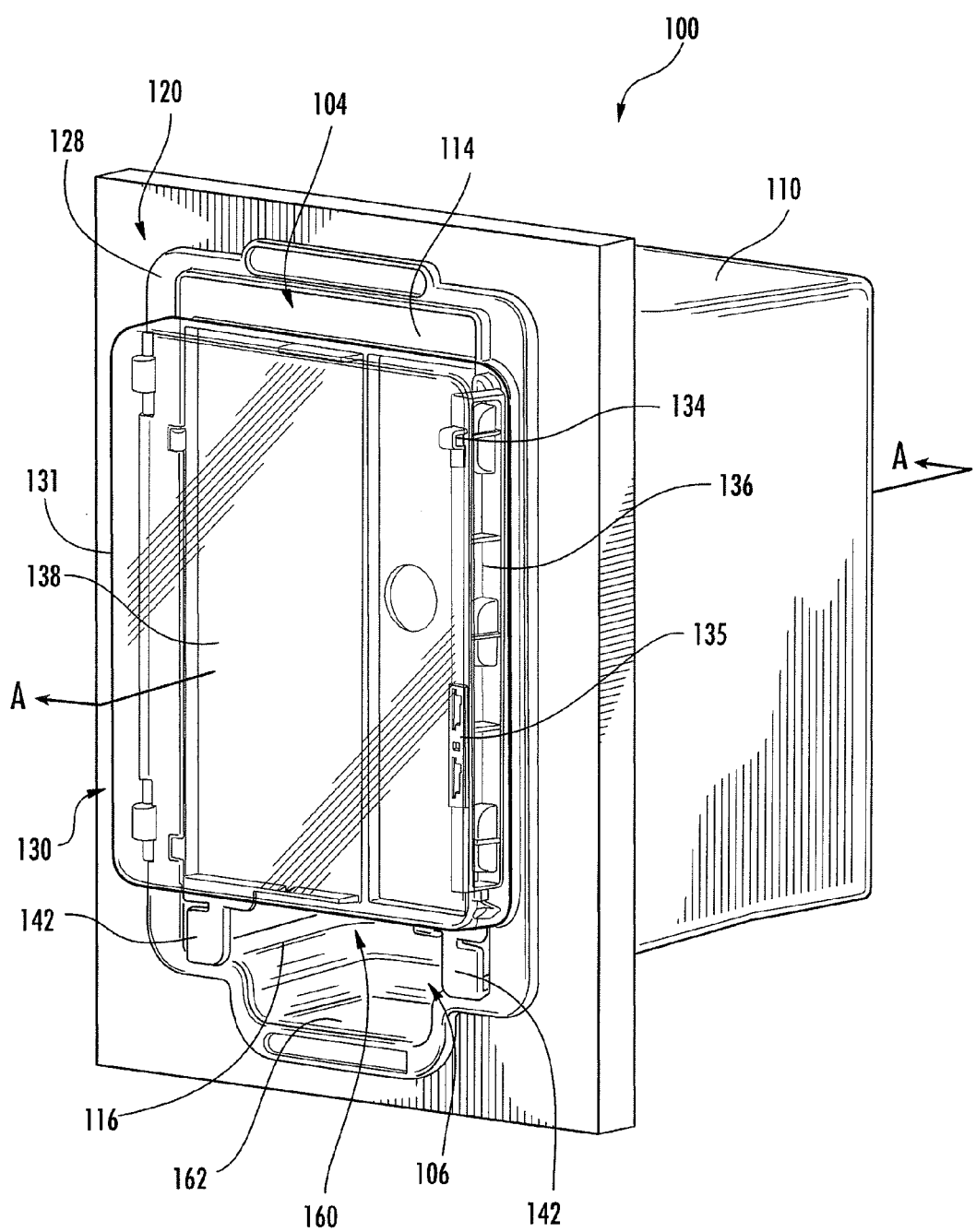
Figure 2:
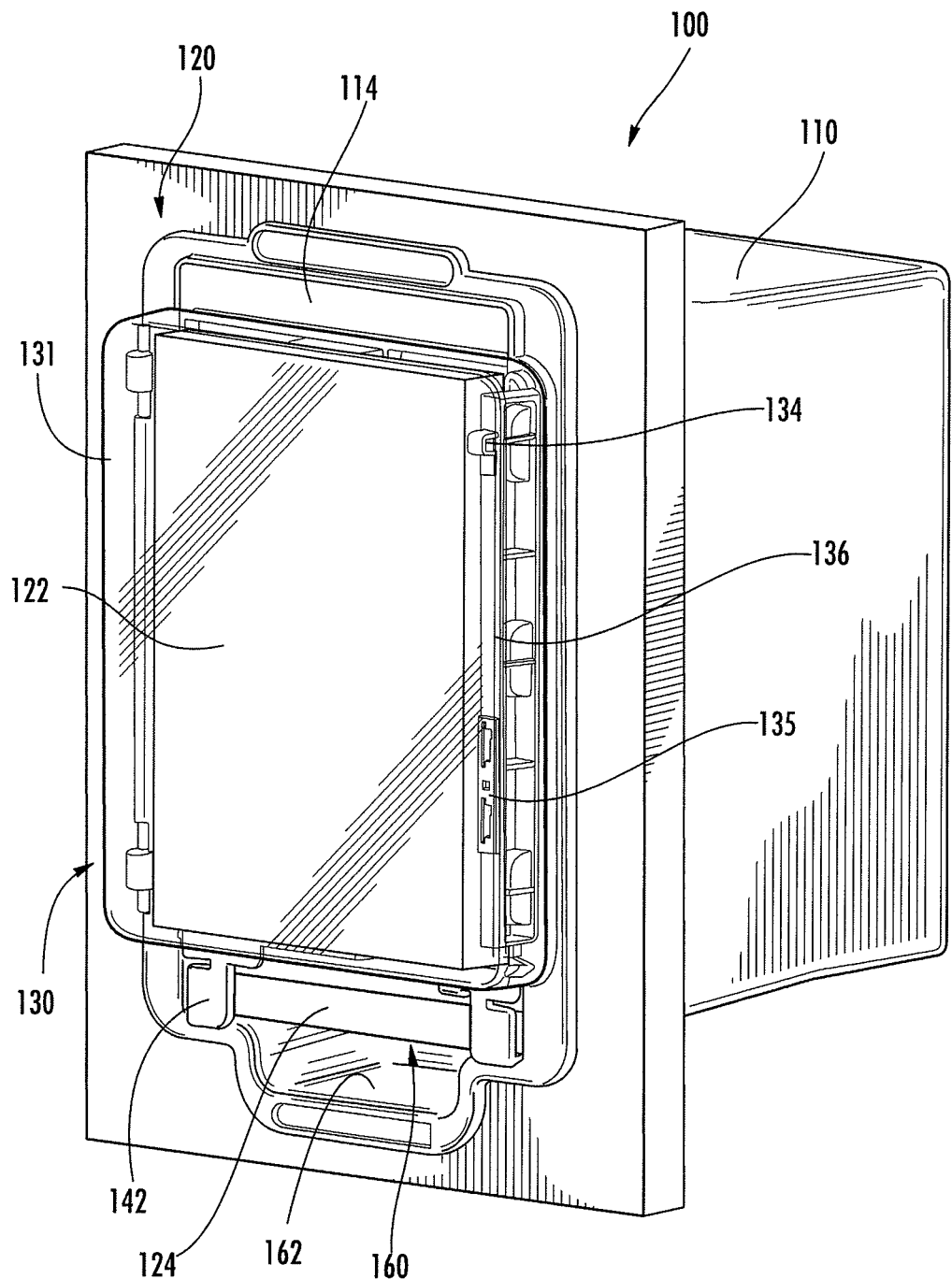
Figure 3:
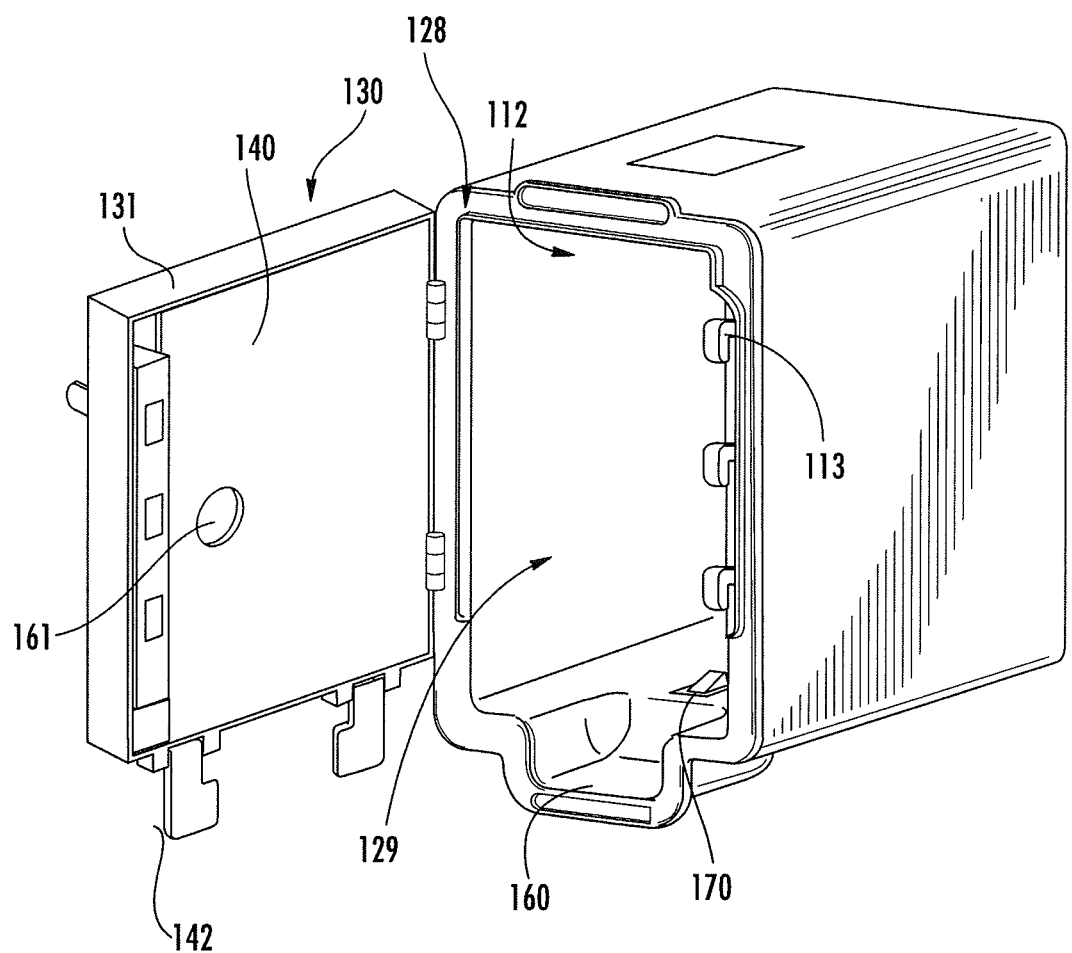
Figure 4:
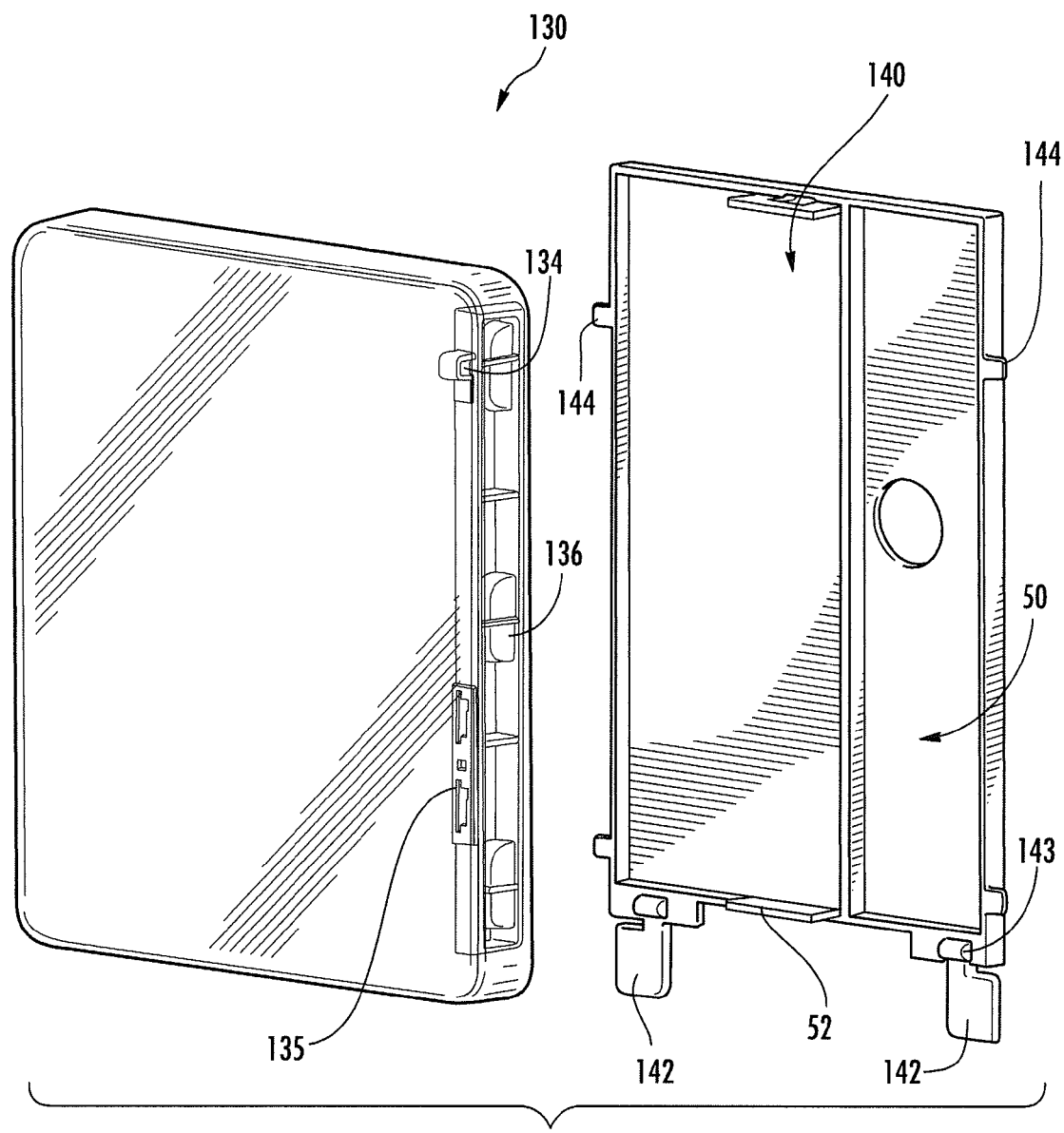
Figure 8:
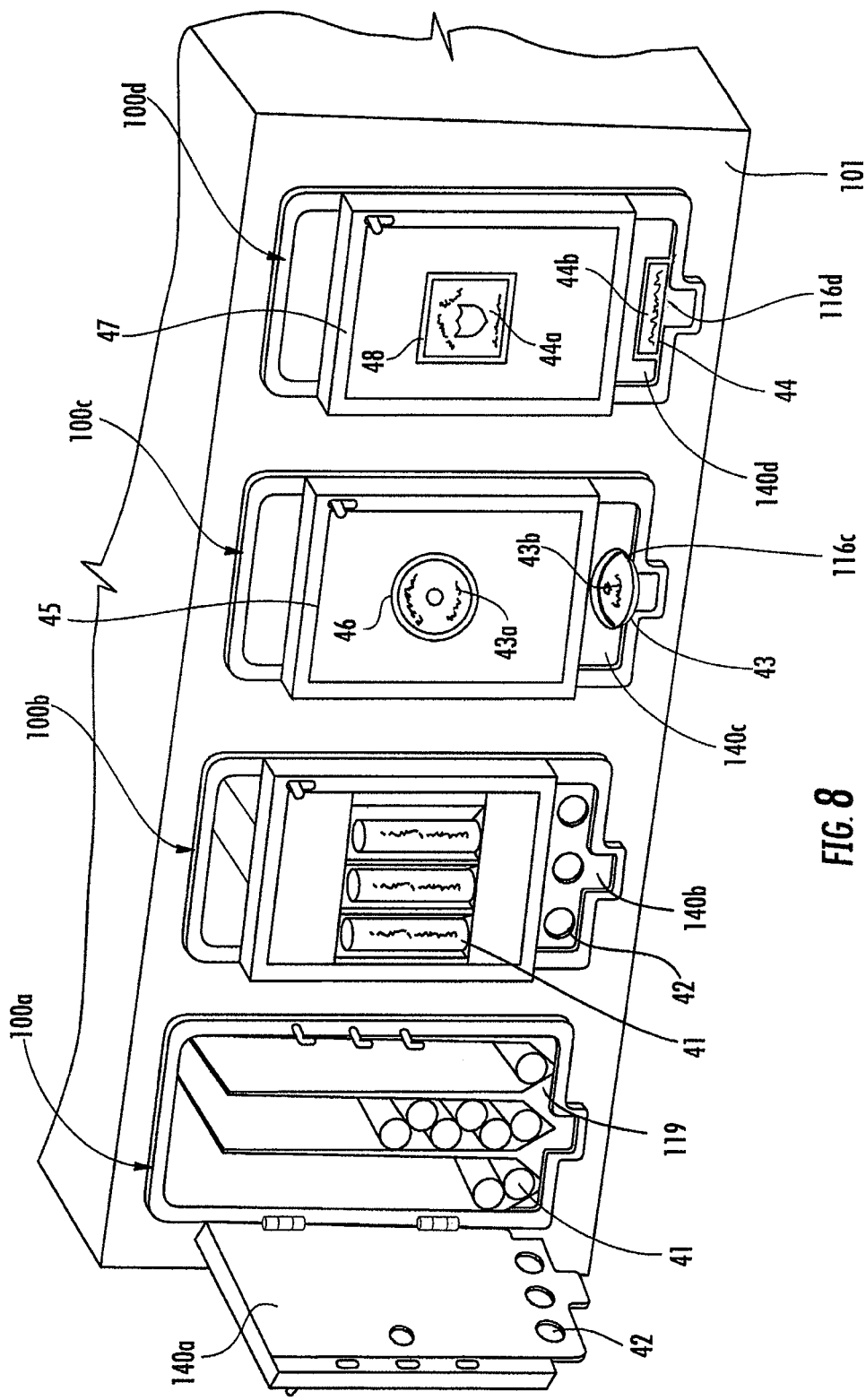
Figure 9:
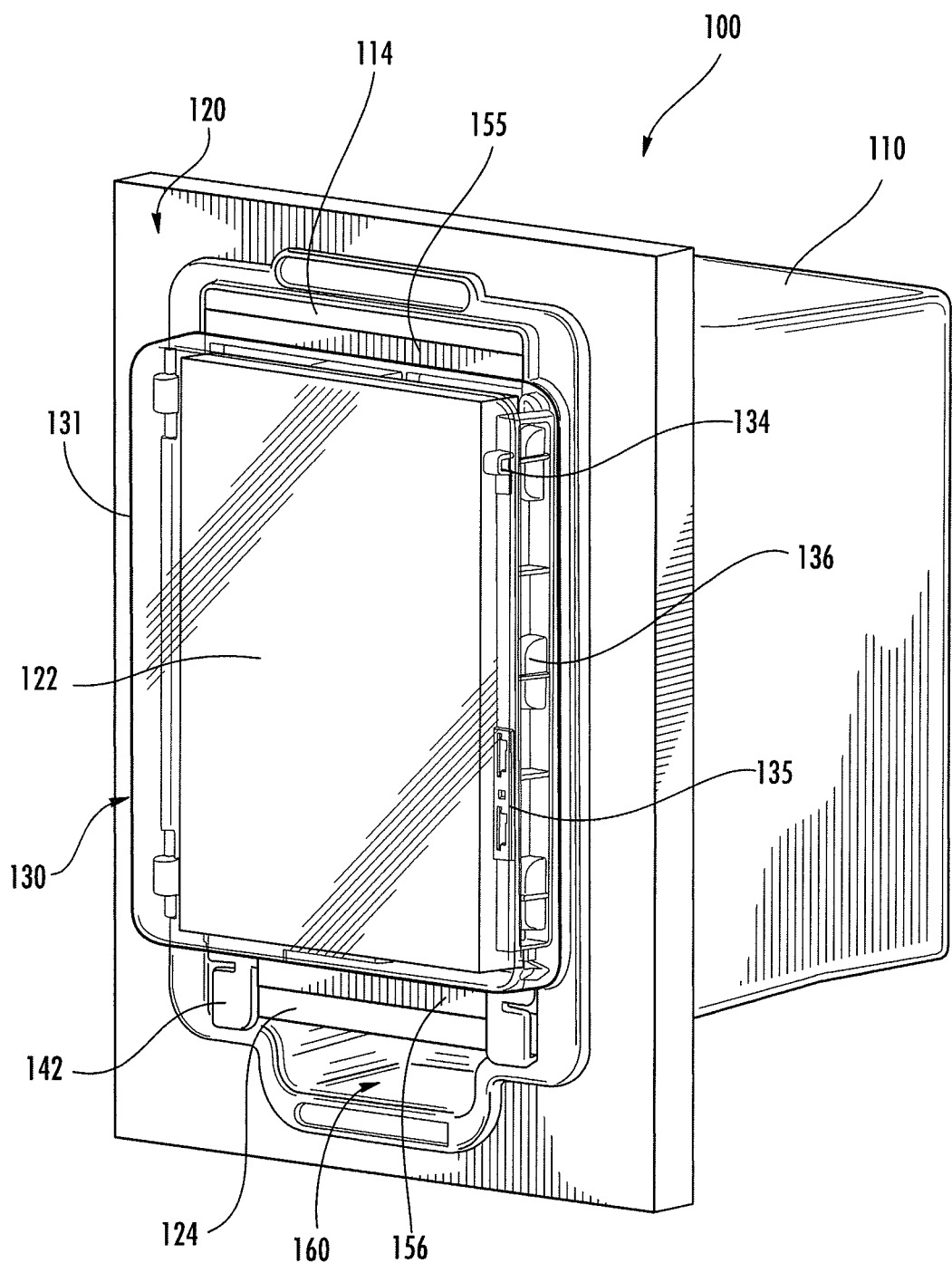
Figure 10A:
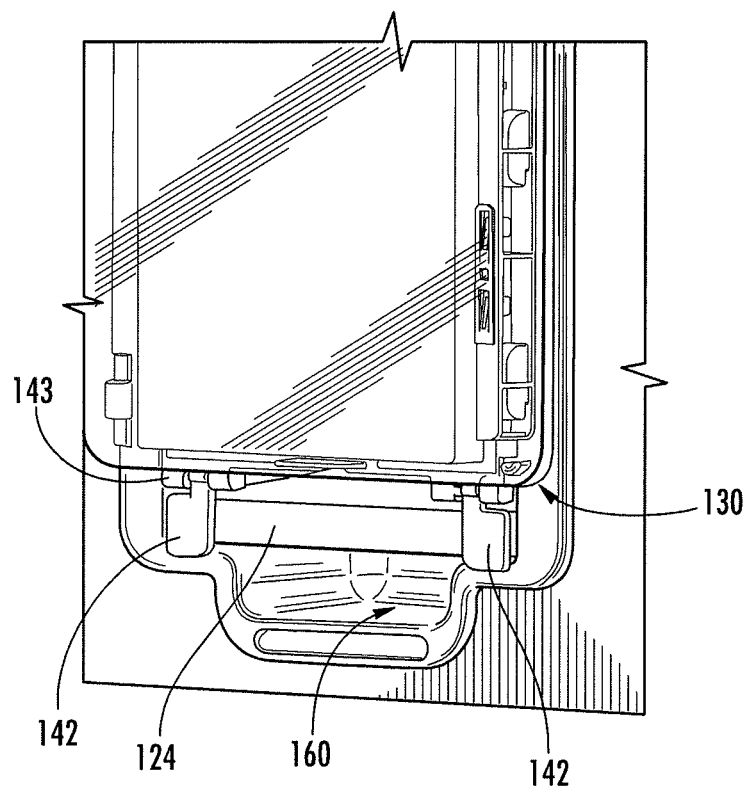
Figure 10B:
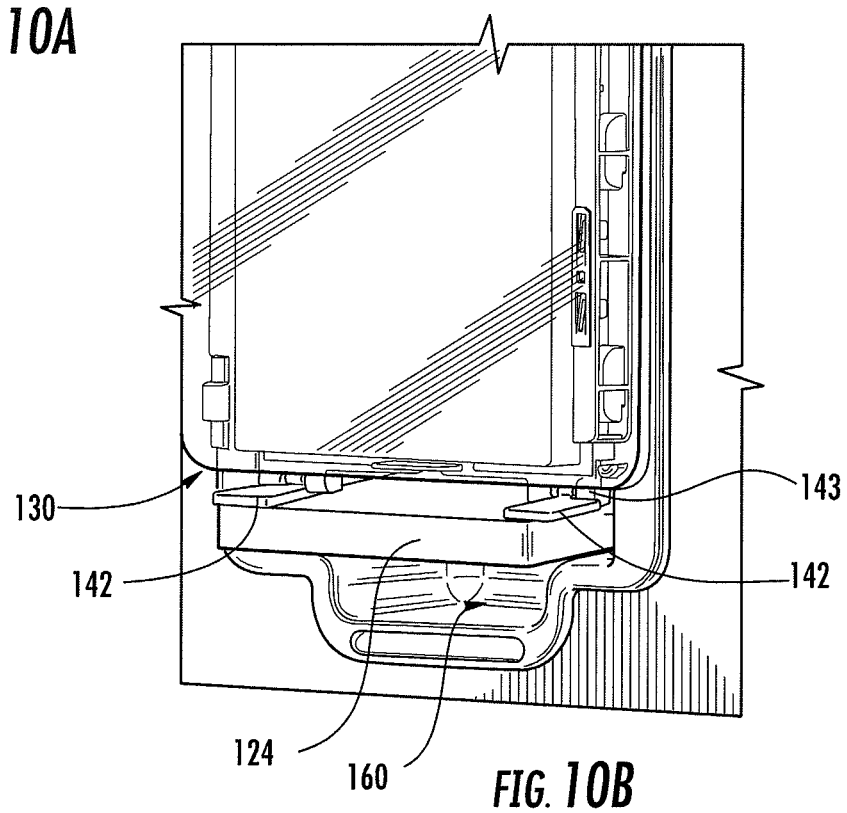
Figure 11:
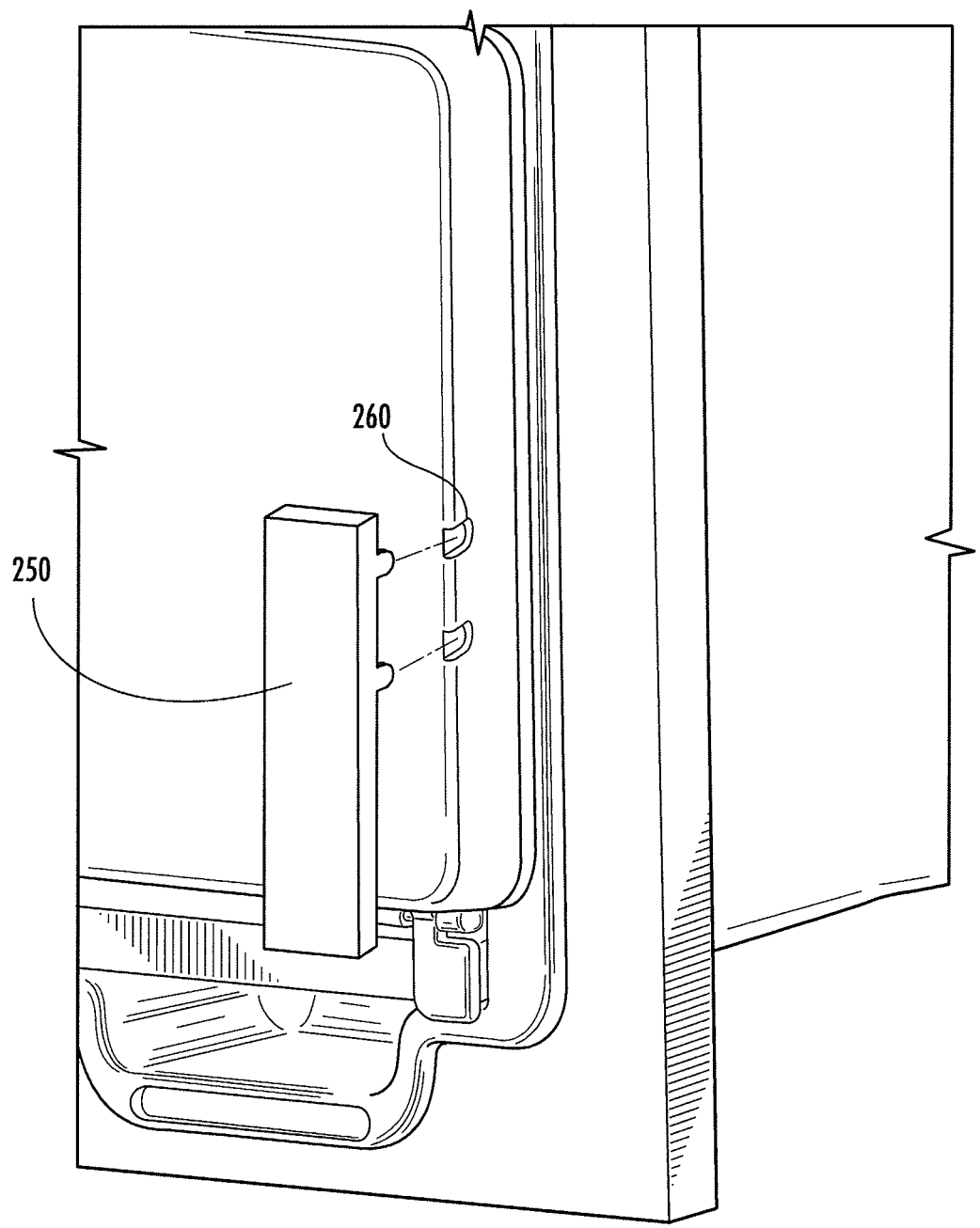
Figure 12:
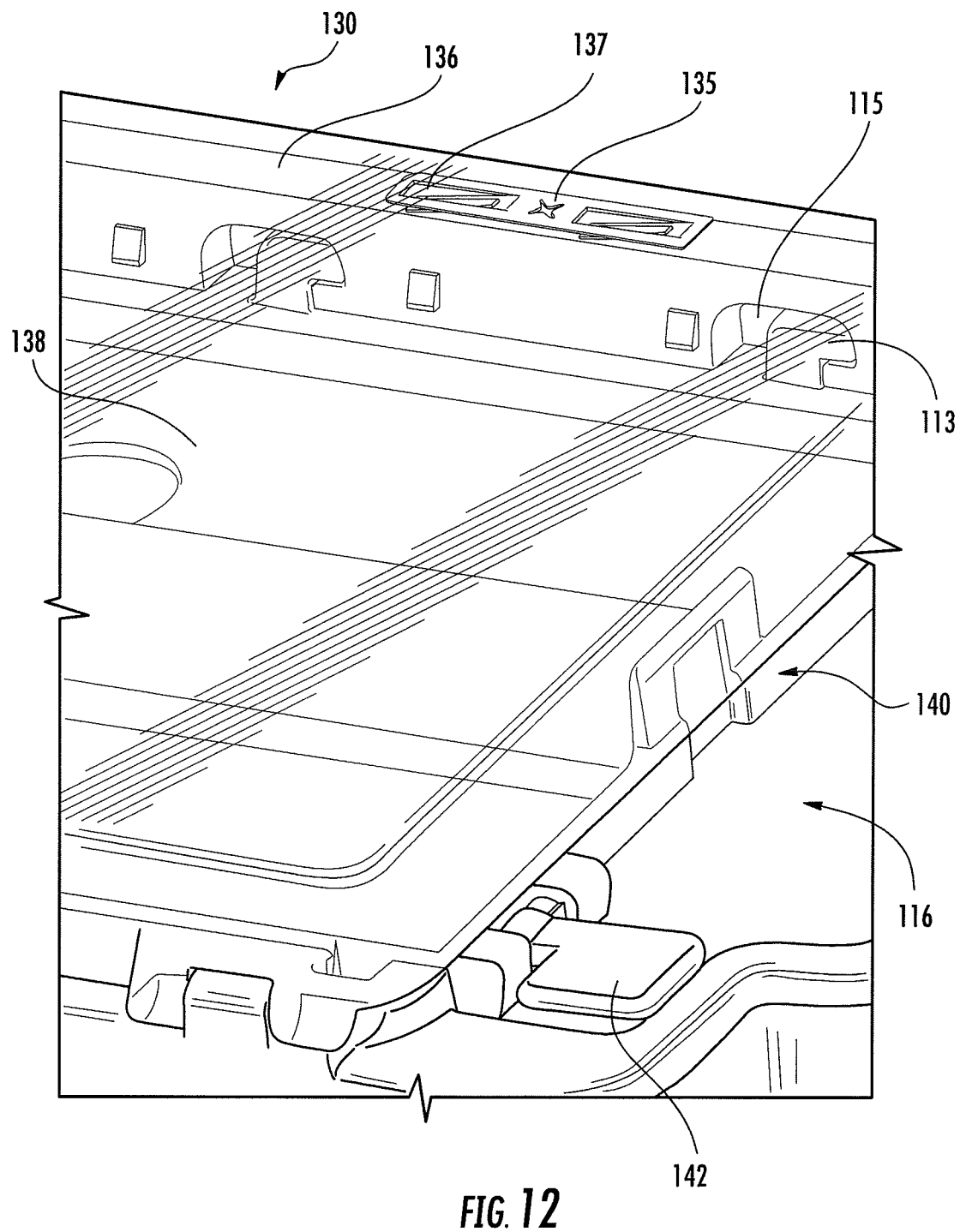
Figure 13:
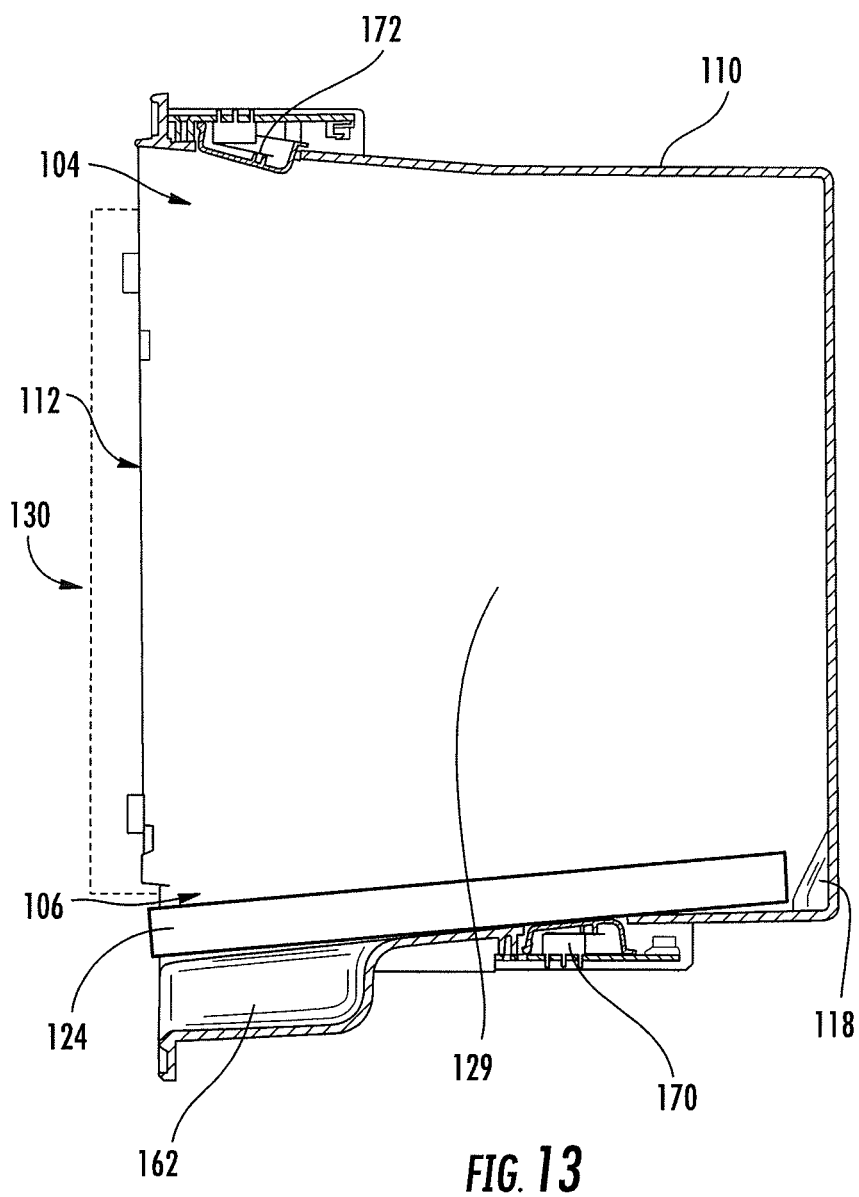
Figure 14:
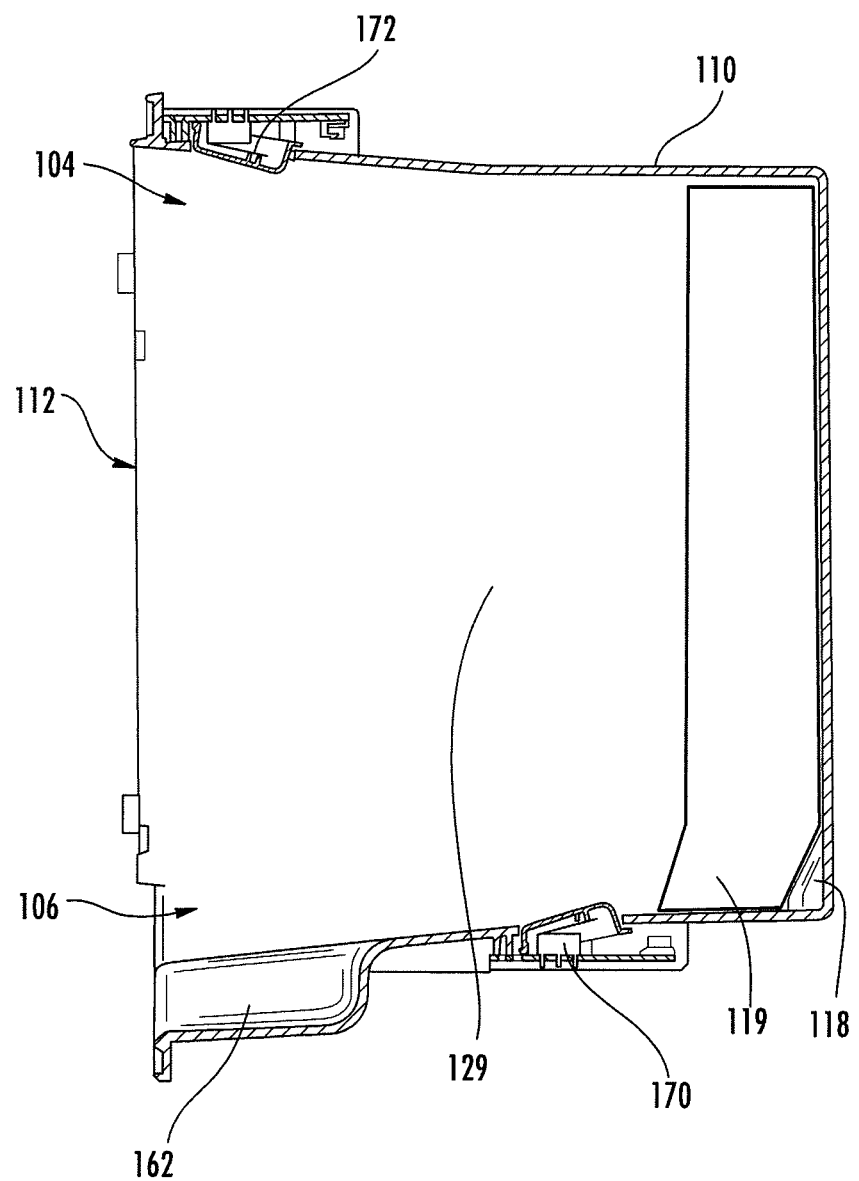
Figure 15:
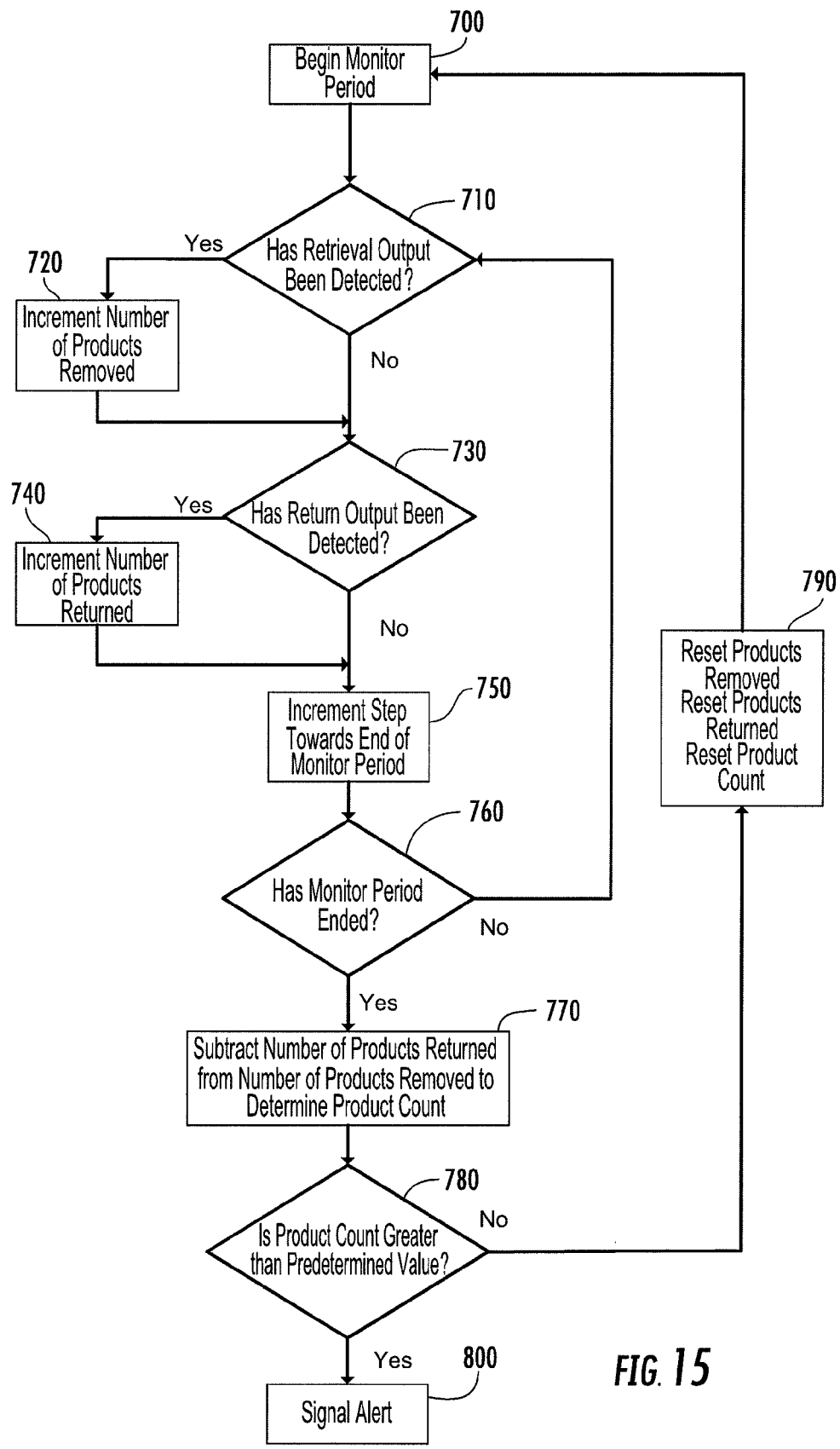
Figure 16:
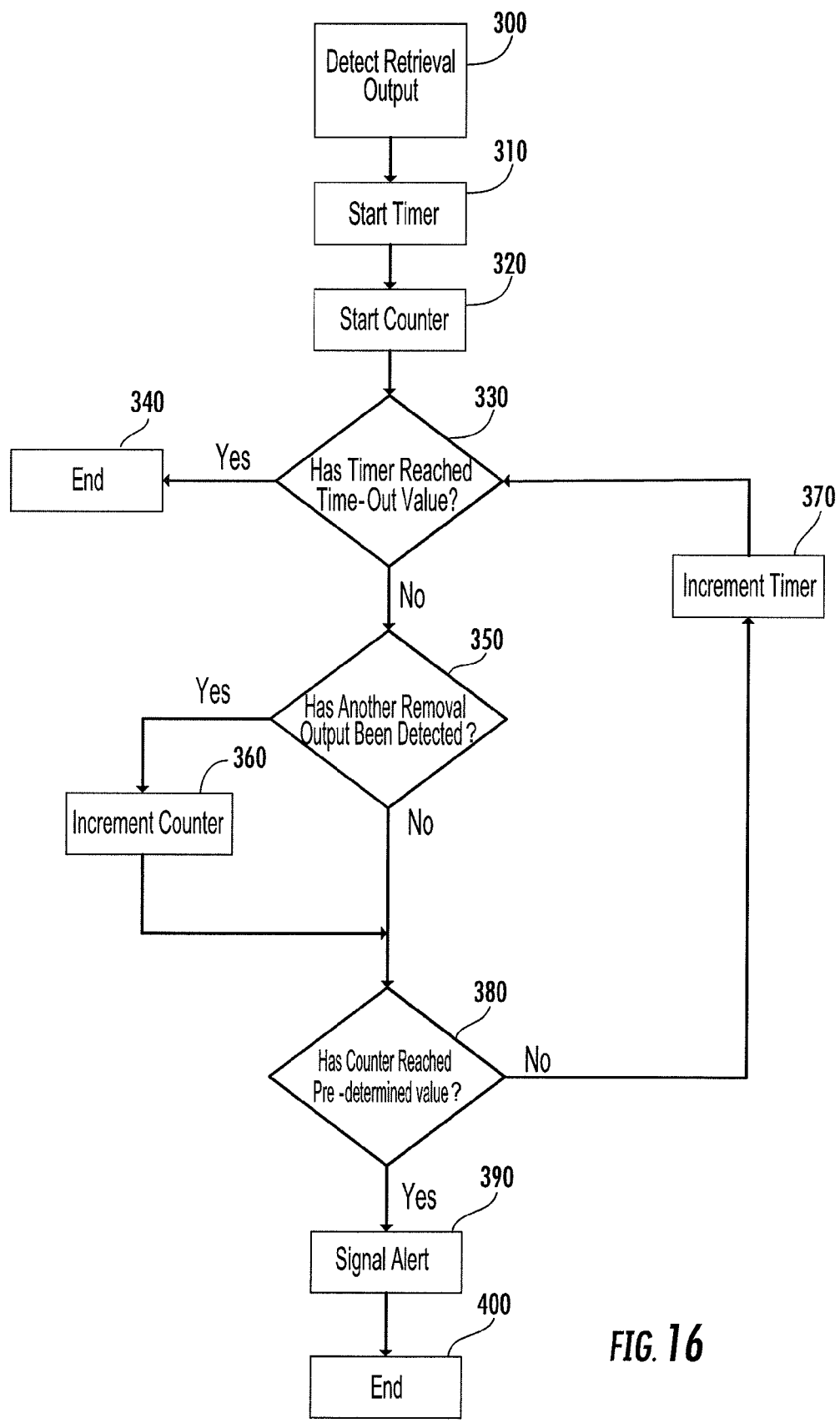
Figure 17:
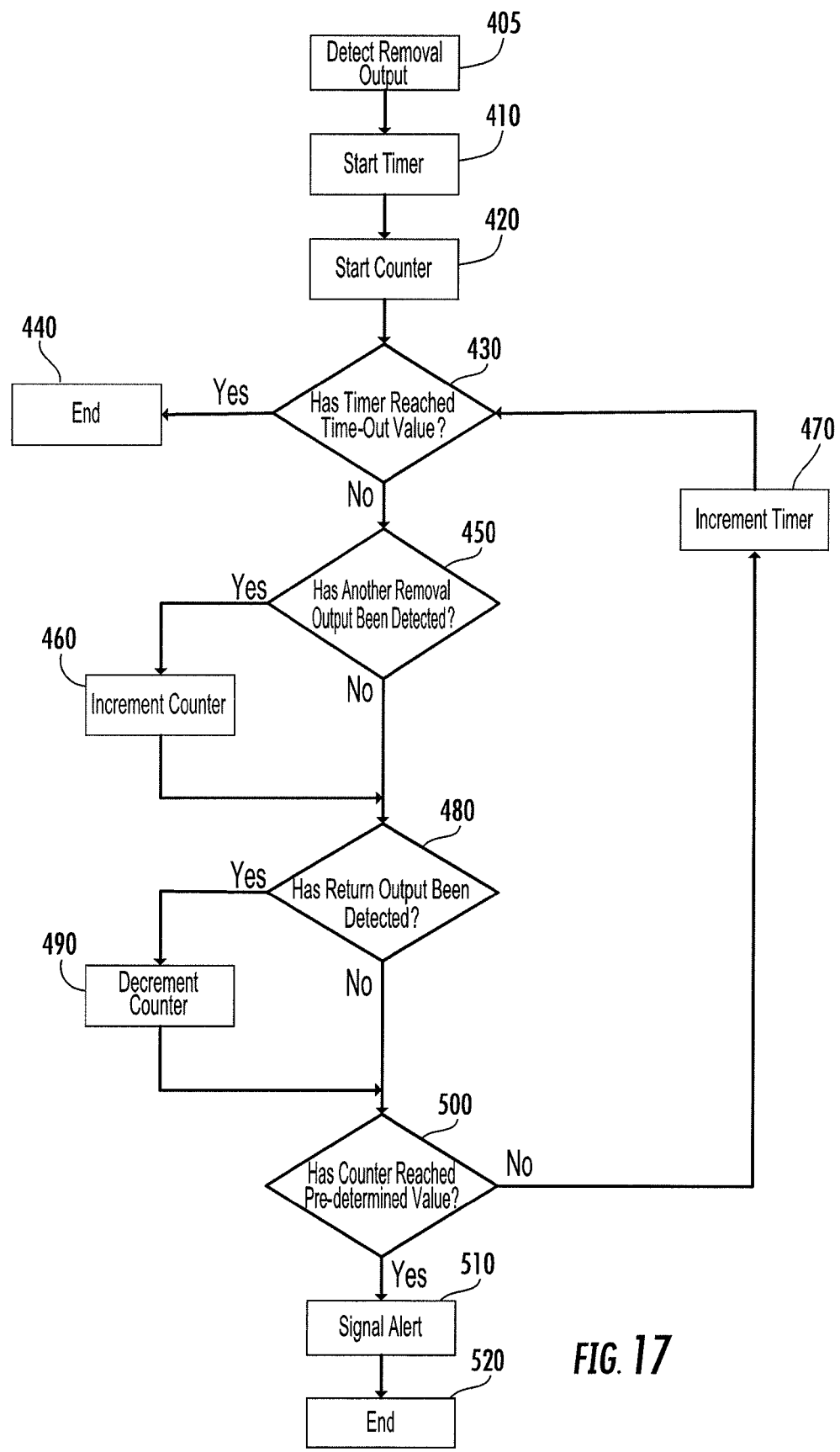
Figure 18:
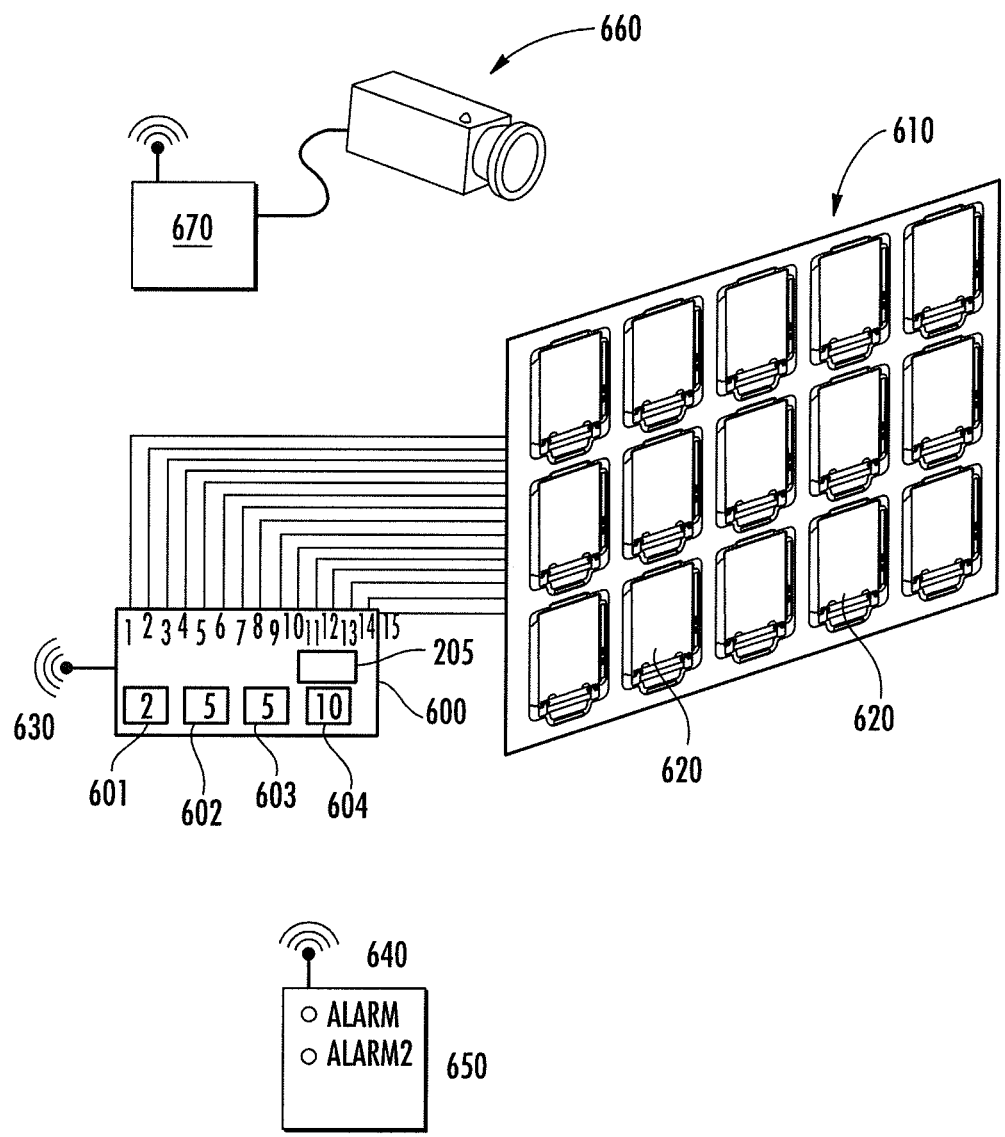

Having thus described the invention in general terms, reference will now be made to the accompanying drawings, which are not necessarily drawn to scale, and wherein:

FIG. 1 is a perspective view of a product display apparatus according to one embodiment of the present invention;

FIG. 2 is a perspective view of the product display apparatus according to the embodiment of FIG. 1, further including the product;

FIG. 3 is a perspective view of a product display apparatus having a door assembly configured in an open position according to one embodiment of the present invention;

FIG. 4 is an exploded view of a door assembly and a modular display portion according to one embodiment of the present invention;

FIG. 5 is a perspective view of a modular display portion according to one embodiment of the present invention;

FIG. 6 is a perspective view of a modular display portion according to another embodiment of the present invention;

FIG. 7 is a perspective view of a modular display portion according to yet another embodiment of the present invention;

FIG. 8 is a perspective view of a series of product display apparatuses in a display structure according to one embodiment of the present invention;

FIG. 9 is a perspective view of a product display apparatus with return and retrieval areas restricted to define a single unit return opening and a single unit retrieval opening, respectively, according to one embodiment of the present invention;

FIG. 10A is a perspective view of load blocking members extending from the product display apparatus shown in FIG. 2, wherein the load blocking members are in the blocked position according to one embodiment of the present invention;

FIG. 10B is a perspective view of the load blocking members depicted in FIG. 10A in the retrieval position;

FIG. 11 is a perspective view of a key and key alignment features for unlocking a product display apparatus lock according to one embodiment of the present invention;

FIG. 12 is a perspective view of a lock for a product display apparatus according to one embodiment of the present invention;

FIG. 13 is a section view of the product supply module depicted in FIG. 3, taken along section lines A-A further including a product;

FIG. 14 is a section view of the product supply module depicted in FIG. 12, further including a storage area insert according to one embodiment of the present invention;

FIG. 15 is a flow diagram illustrating a method for generating an alert according to one embodiment of the present invention;

FIG. 16 is a flow diagram illustrating a method for generating an alert according to another embodiment of the present invention;

FIG. 17 is a flow diagram illustrating a method for generating an alert according to yet another embodiment of the present invention; and FIG. 18 is a schematic diagram of a display system structured according to one embodiment of the present invention.

DETAILED DESCRIPTION OF THE DRAWINGS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention generally relate to a product display apparatus configured to receive a supply of products and dispense the products individually. For ease of explanation, however, the specification and accompanying figures will refer to the display and dispensing of recordable media (DVDs, CDs, video games, etc.) although it is to be understood that any type of retail article may be displayed and dispensed from product displays structured according to the inventive concepts herein defined.

FIG. 1 illustrates a product display apparatus 100 structured according to one embodiment of the invention. The depicted product display apparatus 100 includes a product supply module 110 that may be configured to be inserted into a display housing 120 of a display structures such as a display case, a shelf, a retail aisle partition, a wall, or other similar consumer display surface. In other embodiments, the product supply module may be used as a stand-alone display disposed on a counter in a retail store.

As described in greater detail below, product display apparatuses structured according to various embodiments of the invention may be configured to: (1) prevent bulk retrieval of displayed products to reduce the likelihood of high-volume retail theft, (2) define a single unit retrieval opening that is configured ensure single product retrieval by matching the size, shape, or profile of a displayed product, (3) define a single unit return opening that is configured to reduce product return errors by matching the size, shape, or profile of a displayed product, (4) prevent product loading or return through the single unit retrieval opening while encouraging easy retrieval access of displayed products, (5) provide easy and reliable adjustment of the product display apparatus to accommodate products having differing sizes, shapes, or profiles, (6) automatically detect instances of product retrieval and return, (7) and transmit one or more alert conditions in response to detecting various product-related conditions. The above configurations are provided for illustration purposes and should not be construed being required by each embodiment described herein. As will be apparent to one of skill in the art, various embodiments will embody one or more of the above configurations while others do not.

The depicted product supply module 110 defines a top, a bottom, two sides, and a back panel. Although depicted as defining a generally rectangular shape, other product supply module shapes (e.g., square, rounded, etc.) may be used in accordance with embodiments of the invention as will be apparent to one of skill in the art. The product supply module 110 defines a storage area 129 that is structured to receive and store a plurality products.

The product supply module 110 further comprises a support frame 128 proximate the front of the product supply module 110. The depicted product supply module 110 and support frame 128 are formed as an integral injection molded unit, however, in other embodiments, may be discrete components. A door assembly 130 is hingedly coupled to the support frame 128 and is moveable between an open position and a closed position, wherein the open position may include a partially open position. The closed position is achieved when the portion of the door assembly 130 opposite the hinge is seated against the support frame 128. The depicted display module 110 includes a lock for securing the door assembly 130 in the closed position.

When the door assembly 130 is in the open position, the product supply module 110 defines a bulk access opening 112 as shown FIG. 3. In the depicted embodiment, the support frame 128 at least partially surrounds and thereby defines the bulk access opening 112. The bulk access opening 112 provides bulk-access to the storage area 129, i.e., the opening is large enough such that no mechanical or structural impediment exists that might prevent an operator from inserting or removing two or more products from the storage area 129. The bulk access opening 112 is substantially blocked when the door assembly 130 is in the closed position as shown in FIGS. 1 and 2.

The depicted product supply module 110 defines a return area 104 between the door assembly 130 and the support frame 128 proximate a first side (e.g., an upper side) of the door assembly 130 as shown in FIGS. 1 and 2. The depicted product supply module 110 also defines a retrieval area 106 between the door assembly 130 and the support frame 128 proximate a second side (e.g., a lower side) of the door assembly 130. In the depicted embodiment, the return area 104 and the retrieval area 106 are simply portions of the bulk access opening 112 that are not blocked when the door assembly 130 is placed in the closed position. In one embodiment, a grasping recess 162 located below the retrieval area 106 may facilitate easy grasping of a bottom-most product 124 in storage area 129. In another embodiment, the return area 104 and/or the retrieval area 106 may be structured to accommodate the return or retrieval of a single displayed product. In still another embodiment, the return area 104 and/or retrieval area 106 may be structured to be larger that the largest product intended to be displayed by the product supply apparatus. In still other embodiments, the return area 104 may define a relatively larger size and/or shape than the retrieval area 104.

The illustrated embodiment depicts a product display 100 that may be inserted into a variety of different display structures including, but not limited to, a mobile display cart, a single-unit housing, a display wall, a shelf, or any number of structures. The product display may be attached to the display structure through any conventional means such as screws, rivets, or other attaching means. Though the illustrated embodiment shows a product supply module 110 coupled to the support frame 128 as a single unit, other embodiments of the present invention may include a storage area defined by a shelf or cavity within a display system. For example, a shelf may be configured with adjustable partitions that can be configured to provide a supply module for a product display that is attached to the front of the shelf. Embodiments of the present invention may only require a support frame with a door assembly that can be attached to a pre-existing supply cavity to convert said supply cavity into a single-unit access display.

Various embodiments of the invention may include a modular display portion 140 coupled to the door assembly 130. In one embodiment, the modular display portion 140 may define a size and shape that conforms generally to that of the door assembly as shown in FIGS. 1-3. In other embodiments, the modular display portion 140 may be structured to extend at least partially beyond the door assembly 130 into the retrieval area 106 as shown in FIG. 9. In this way, the modular display portion 140 may define a single unit retrieval opening 116 that is structured to allow a customer to remove only a single product from the product supply module 110 by restricting the size and/or shape of the retrieval area 106 to a profile to match the profile of a single product. This structure may be particularly useful in embodiments where the retrieval opening 106 is manufactured to define a standard size capable of accommodating relatively large products but wherein it is desirable to customize the size and/or shape of the retrieval area, i.e., to define a single unit retrieval opening 116, at the retail store location to adapt the product display apparatus to dispense products having a relatively smaller size, shape, or differing profile.

In another embodiment, the modular display portion 140 may be structured to extend at least partially into the return area 104 to define a single unit return opening 114 that is configured to permit a user to return only a single product to the storage area 129 of the product supply module 110. In another embodiment, the single unit return opening 114 may be structured to allow the return of products having a selected size, shape, and/or profile. In this way, the display product display apparatus may be configured to prevent products having a different size, shape, or profile (e.g., a DVD) from being returned into a storage area targeted for a selected product (e.g., a CD).

As shown in FIGS. 1, 2 and 3, the door assembly 130 is attachable to the modular display portion 140 to define a display cavity 138 within the door assembly 130. The display cavity 138 may be configured to hold a display product 122 representative of the plurality of products 124 kept within the storage area 129 of the product supply module 110. The display product 122 is held within the door assembly 130 by the modular display portion 140 for protected viewing by the consumer, i.e., the product is visible to the consumer, but not accessible.

In some embodiments, the modular display portion 140 may snap or slide into the door assembly 130 when the door assembly is in the open position; however, when the door assembly 130 is in the closed and locked position; access to the modular display portion 140 is prohibited. FIG. 4 depicts the door assembly 130 separated from the modular display portion 140. The modular display portion 140 may include snap tabs 144 that are releasably received by the door case 131 of the door assembly 140 to allow easy, tool-free interchangeability with the door assembly 130. Other modular display portion 140 attachment configurations may be used as will be apparent to one of ordinary skill in the art in view of this disclosure.

Modular display portions structured in accordance with various embodiments of the invention may be tailored or customized to a selected product. For example, as discussed above, the modular display portions may be structured to define specific single unit retrieval and/or single unit return openings that are sized to receive products having a selected size, shape, and/or profile. Modular display portions may also be configured to define a pocket structured to at least partially receive and position a product for display within the door assembly, i.e., behind the door case as discussed in greater detail below.

For illustration purposes, the modular display portion 140 shown in FIG. 4 is configured to display a standard-sized DVD package while the modular display portion 140' illustrated in FIG. 5 is configured to display a standard-sized CD jewel case. Each modular display portion 140, 140' defines a pocket 50, 50' or support structure 52, 52' for at least partially receiving and positioning a product for display within the door assembly. In some embodiments, the modular display portion need not define a pocket and may simply include one or more support structures as shown in FIGS. 6 and 7. The term "support structures" is not limited to a shelf-like structure as illustrated in the figures and may refer more broadly to any structure adapted to support a displayed product including, for example, tabs positioned on opposite sides of the product such that the product may be snapped into place.

In one embodiment, as shown in FIG. 6, the modular display portion 140" may include a display screen 145 such as a liquid crystal display (LCD) in lieu of, or in addition to the displayed product 122. The modular display portion 140" may also include one or more small speakers 146. For example, if a DVD of a movie is the product contained within the product supply module, a modular display 140" with a display screen 145 may show a promotional video trailer advertising the movie. If there are a plurality of product display apparatuses in the same vicinity, audio that would accompany such a video display may be initiated by pressing an attached button 150, accessible through the door case 131 of the door assembly 130, to prevent the plurality of audio tracks creating a distracting cacophony in the area of the display. A further iteration of this embodiment may be to display a picture of the DVD movie cover on the display screen 145 wherein a customer can press the attached button 150 to start the movie trailer with sound on the display screen. This application may also apply to audio discs by showing a music video or simply playing audio from the disc. Power for the display screen 145 and the speakers 146 may come from a battery (not shown) stored within the modular display portion 140", from a battery stored elsewhere in the product display apparatus, or from a remote source (e.g., electric outlet) that is placed in electric communication with the product display apparatus.

In another embodiment, as depicted in FIG. 7, the modular display portion 140''' may include a smaller display screen 148 that may display only price information or a scrolling marquee of information. The modular display portion 140''' incorporating the smaller display screen 148 may also accommodate a pocket and/or support structure for receiving and positioning a display product 122.

Still other embodiments of the modular display portion are illustrated in FIG. 8 wherein a plurality of product displays 100a, 100b, 100c, and 100d are arranged in a single display structure 101. The display structure 101 of the depicted embodiment may be configured for display on a counter in a store or in a typical shelf in a grocery store among other locations. The modular display portions 140a, 140b, 140c, 140d are configured for displaying and dispensing products of differing sizes, shapes, and/or profiles. For example, modular portion 140b of product display 100b is configured to display three cylindrical products 41 such as three lipsticks, and dispense each one below the corresponding displayed product. A similar product display is illustrated in the open position at product display 100a wherein a storage area insert 119, discussed further below, may be configured to accommodate three columns of products as shown for dispensing through three discrete holes 42 in the modular display portion 140a.

Another embodiment illustrated in FIG. 8 is shown in product display 100c wherein a product 43 is displayed and dispensed that defines a circular shape 43a and an elliptical profile 43b, such as a make-up compact. The support structure 45 of product display 100c defines a circular pocket 46 to hold the product 43 that defines a circular shape 43a. Product display 100d is configured to display and dispense a product 44 that defines a square shape 44a and a rectangular profile 44b. The support structure 47 of product display 100d defines a square pocket 48 to hold the product 44 that defines a square shape 44a. As the profile of the products 43 and 44 are both narrower and thinner than the retrieval area, the modular display portions 140c, 140d extend at least partially into the retrieval area to restrict the size, shape, and/or profile of the single unit retrieval openings 116c, 116d to a size, shape, and/or profile that mechanically allows only a single product 43, 44 to be removed from the storage area at one time. In the depicted embodiment, the single unit retrieval openings 116c 116d are approximately congruent with the size, shape, and/or profile of a properly aligned side of the corresponding products 43, 44.

Though not illustrated, it may be desirable for the modular display portion to be configured to block access to the retrieval area completely or to define a retrieval area that is too small to allow a product to be retrieved. Such an embodiment may be useful for a display system having one or more product supply modules that are empty or not currently in use. In another embodiment, although several mutually adjacent product display modules may be configured to store a selected product (perhaps sharing a common or linked storage area), the retailer may find it desirable for customers to retrieve the product from only one of the product display modules. Thus, the modular display portions of the remaining product display modules may be configured to block access to their respective retrieval areas. In such an embodiment, the blocked product display modules may serve as a storage location for excess stock. In still another embodiment, blocked product display modules may be used to display a product prior to it being available for sale, such as a video game that is scheduled for release at some future date.

As noted above, modular display portions structured in accordance with various embodiments are customized and interchangeable such that a first modular display portion may be removed from the door assembly and a second modular display portion may be attached in its place. As compared to the first modular display portion, the second modular display portion may be configured to restrict the size of the single unit return opening 114 and the single unit retrieval opening 116 as illustrated in FIG. 9. When a plurality of product displays are used in close proximity to one another, they may each contain a different size product such as CDs versus DVDs. It may be desirable to prevent a customer from returning the DVDs of one product display to the return area or single unit return opening of an adjacent product display that is intended for CDs. Further, since the profile of a typical CD jewel case is thinner than the profile of a typical DVD case, it may be desirable to ensure that only one CD may be removed from the single unit retrieval opening, which may not be ensured if the single unit retrieval opening is sized according to the profile of a DVD. This may be accomplished by restricting the size of the single unit return and retrieval openings 114, 116 to correspond to the size, shape and/or profile of the display product 122 displayed in the display cavity 138.

In the depicted embodiment of FIG. 9, the modular display portion 140 extends beyond the top of the door case 131 of the door assembly 130 and beyond the bottom of the door case 131 of the door assembly 130. These extensions 155, 156 restrict the size and shape of return area and the retrieval area to define the single unit return opening 114 and the single unit retrieval opening 116, respectively. The depicted single unit return opening 114 and the single unit retrieval opening 116 are each sized and shaped to receive only a single product unit of a selected size, shape, and/or profile.

Although not shown, as discussed above, it may be desirable to only restrict the size of the retrieval area to define a single unit retrieval opening. It may not be desirable to restrict the size of the return area. In such an embodiment, the modular display portion may include only extension 156 and would not include extension 155. As a result, larger or multiple products may be allowed to be returned through the return area (depending upon its manufactured size) while only a single product may be retrieved through the single unit retrieval opening.

In other embodiments, the modular display portion 140 may also be configured to be adjustable. The modular display portion 140 may include slide, ratchet, flip tabs, or other similar adjustment mechanisms by which the extensions 155 and 156 may be increased or decreased into the return and retrieval areas 104, 106. This adjustment may be used to customize the modular display portion to a selected product and would be performed while the door assembly is in the open position. Adjustment would be prohibited when the door assembly is in the closed position.

Returning to the embodiments depicted in FIGS. 1 through 5, one or more load block member(s) 142 may be disposed proximate the retrieval area 106. In one embodiment, the load block member(s) 142 are biased toward a blocked position (as shown) that is structured to prevent a product from being returned into the storage area through the retrieval area 106. The load block member(s) 142 may be hinged to allow retrieval of a product through the retrieval area 106. The depicted embodiment includes two load block members 142 that are spaced apart to define an access port 160 therebetween. The depicted load block member(s) 142 are configured such that a user may grasp the bottom-most product within the storage area via the access port 160 between the load block members. As shown in FIGS. 10A and 10B, the load block members 142 are driven from the blocked position in FIG. 10A to a retrieval position in FIG. 10B by the user grasping the product within the storage area and withdrawing the product through the retrieval area.

In some embodiments, the load block members may be hingedly coupled to the door assembly (not shown). In other embodiments, such as those shown in FIGS. 4, 10A and 10B, the load block members are coupled to the modular display portion by a hinge 143 such that the load block members are configured to rotate from the blocked position to the retrieval position about the hinge 143. In still other embodiments, the load block members are biased toward the blocked position by a torsion spring associated with the hinge or other biasing mechanisms known in the art.

The door assembly may be configured to lock in the closed position. The lock may be of a variety of known arrangements including among others, cam-locks, bolt-style locks, combination locks, and electro-mechanical locks; however, the lock illustrated herein includes a sliding lock mechanism. The sliding lock mechanism of the embodiment illustrated in FIG. 9 includes a sliding lock member 136, a lock release 134, and a latching spring 135 to secure the sliding lock member 136 in place. The sliding lock member 136 may be retained within the door assembly 130 with the lock release 134 protruding through the door case 131 of the door assembly 130, wherein the lock release 134 is accessible from the outside of the product display 100 when the door assembly is in the closed position. The latching spring 135 may be a flat spring member as illustrated in FIG. 12 and may be disposed between the sliding lock member 136 and the door assembly 130 and secured to the door assembly such that the sliding lock member 136 is disposed in a locked position when the door assembly is closed and locked. The door assembly 130 may include an alignment feature 260 shown in FIG. 11 to align a key 250 with the latching spring 135. Upon aligning the magnetic key 250 with the alignment feature 260 of the door assembly 130, the latching spring 135 may be retracted to an unlatched position that allows the sliding lock member 136 to be moved to an unlocked position by sliding the lock release 134. When the sliding lock member 136 is in the locked position, the sliding lock member is securely engaged with locking tabs 113 that are attached to the product supply module 110 as shown in FIG. 3. When the sliding lock member 136 is in the unlocked position, the sliding lock member is disengaged from the locking tabs 113 and the door assembly is allowed to pivot to the open position.

Referring back to FIG. 12, the locking tabs 113 of the product supply bin are generally L-shaped. The cavities 115 in the sliding lock member 136 that correspond to each locking tab 113 allow the L-shaped locking tabs 113 to be received when the sliding lock member 136 is in the unlocked position and prevent the locking tabs 113 from being disengaged from the sliding lock member 136 when the sliding lock member 136 is in the locked position. The latching spring 135 engages the sliding lock member 136 via recesses 137 in the sliding lock member when the sliding lock member 136 is in the locked position. Application of the magnetic key 250 aligned with the alignment feature 260 disengages the latching spring 135 from the recesses 137 and allows the sliding lock member to be slid to the unlocked position, thereby allowing the locking tabs 113 to be disengaged from the recesses 115 in the sliding lock member 136.

As illustrated in FIG. 13, the product supply module 110 may contain biasing member 118 proximate the bottom of the storage area 129. The biasing member 118 urges the bottom-most product 124 toward the door assembly 130 such that when the door assembly is in the closed position, the bottom-most product 124 is urged closer to the retrieval area 106. This aids removal of the bottom-most product 124 from the product display 100 and further helps to separate products that might otherwise tend to stick together, e.g., products having a strong static attraction due to their cellophane packaging. The biasing member 118 may further position the bottom-most product 124 at least partially into the retrieval area 106 such that at least a portion of the product 124 sits immediately below the door assembly 130. As a result, the door assembly 130 generally blocks and/or mechanically prevents a customer from inadvertently lifting the product 124 during or immediately prior to retrieval, which could result in mis-reads by the retrieval detector 170. For example, if a bottom-most product were lifted upwardly (i.e., the door assembly was not positioned to block such lifting) during retrieval such that it was inadvertently lifted off and then returned onto a contract switch retrieval detector of the type described below, a single product retrieval could be improperly double-counted by the retrieval detector.

As illustrated in FIG. 14, a storage area insert 119 may be inserted into the storage area 129 to configure the storage area to accommodate products of various sizes. The storage area insert 119 may include a biasing member 117 to urge the bottom-most product closer to the retrieval area as described above. The storage area insert 119 may be useful for converting a product supply module configured to hold DVDs to accommodate CDs that generally have a smaller size of packaging. Optionally, the storage area insert may be an adjustable back panel of the storage area 129 such that no separate parts are required. Such an embodiment may include a movable back panel and detents or alignment grooves in the product supply module to allow re-positioning of the back panel at a number of pre-defined locations that correspond to typical packaging sizes.

The product display 100 may include a retrieval detector 170 positioned proximate the retrieval area 106 as shown in FIG. 13. The retrieval detector 170 may be a standard contact switch such as the Wealth MX-1348 Detect Switch, a button or plunger, a proximity sensor, an optical sensor, or other sensing device known in the art. The retrieval detector 170 may be disposed in communication with a processor 205 as shown in FIG. 18, and configured to generate a retrieval output, such as an electrical signal, an optical signal, an electromagnetic transmission, or the like, whenever a product is removed from the retrieval area 106 and/or the single unit retrieval opening depending on the application. For example, an electrical signal may be generated by a switch that is in a non-contact position when depressed, and a contact position when released (normally closed). Thus the removal of a single product would cause the plunger to be released and close the electrical contacts to generate an electrical signal. In another embodiment, the retrieval detector may include a sensor or switch associated with a load block member such that a retrieval output is generated when the load block member is driven from the blocked position to the retrieval position.

In still other embodiments, the retrieval detector may be configured to generate a storage output indicative of the quantity of products contained in the storage area. For example, a switch, lever, or plunger positioned on the bottom product support surface of the storage area as illustrated in FIGS. 3, 13, and 14 may serve as the retrieval detector 170. The retrieval detector 170 not only generates a retrieval output when individual products are removed but also is configured to generate a storage output when all products have been removed and the storage area is empty, i.e., when no products remain to hold the retrieval detector 170 in a depressed position.

As noted above, the retrieval detector 170 is disposed in communication with a processor and, in some embodiments; the storage output generated by the retrieval detector may further be configured to initiate a restocking order, a shutdown procedure for the product display, a visual out-of-stock indicator on the display, or any other alert that may be appropriate. The retrieval detector 170 may also be configured for detecting abnormal operation such as rapid removal of product, indicating a potential shoplifting situation as will be described further below.

In another embodiment, the product display apparatus may include a return detector 172 proximate the return area 104 as shown in FIG. 13. The return detector 172 may be a standard contact switch such as Wealth MX-1348 Detect Switch, a button or plunger, a proximity sensor, an optical sensor, or other sensing device known in the art. The return detector 172 may be in communication with a processor and configured to generate a return output, such as an electrical signal, an optical signal, an electromagnetic transmission, or the like, whenever a product is returned to the return area 104. The return output may be a signal that may be generated by a switch that is in a contact position when depressed and a non-contact position when released (normally open). Thus, the insertion of a product would cause the switch to be depressed, closing the electrical contacts to generate an electrical signal.

The return detector 172 proximate the return area 104 may be configured for determining if a product has been returned to the storage area 129. As will be apparent to one of skill in the art in view of this disclosure, the return detector 172 may be used in connection with the retrieval detector 170 to reduce the number of false alerts or to more accurately monitor inventory levels. One such embodiment is discussed below in connection with FIG. 18.

In another embodiment, the return detector 172 proximate the return area 104 may also be configured with the processor to determine the amount of inventory that has been removed from the storage area 129 of the product supply module 110 and not returned. For example, in one embodiment, the processor may be configured to monitor the number of products removed from the product supply module 110, the number of products returned to the product supply module 110, and may further be disposed in communication with a store checkout system so as to monitor the number of products sold during a day. This may allow store personnel to determine how many products were either misplaced within the store when a customer decided not to purchase the product, or how many products were stolen. Such a system would also allow store personnel to determine throughout a business day how many products likely are in transit between the product display module and the cashier or check-out area (i.e., products in possession of customers within the store).

Various embodiments of the invention may include a barcode reader, RFID reader, or similar object authenticator disposed within the product display module proximate the return area 104. Such an authenticator in communication with the processor may be configured to ensure that a correct or authentic product was returned to the storage area of the product supply module. If a product is inserted through the return area 104 that does not correspond to the appropriate contents of the product supply module 110, a visual cue may be presented at the product display 100 or an alert may be sent to appropriate store personnel. The store personnel may then be dispatched to remedy the issue. Such a feature would benefit customer satisfaction as it would ensure that the product removed through the single unit retrieval opening 116 corresponds to the product displayed in the door assembly 130. Another function of such an authentication system may be to maintain proper inventory counts by not counting an improperly returned product. Further, a would-be shoplifter may try to by-pass a rapid removal alarm as discussed herein by inserting dummy products that do not correspond to the particular product in the product supply module of interest. Thus, in one embodiment, an authenticator may be used to discern that an improper or non-authentic product has been returned resulting in no return output being generated and/or an alert being triggered.

The processor 205 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. In some example embodiments, the processor 205 may, but need not, include one or more accompanying digital signal processors. In some example embodiments, the processor 205 may be configured to execute instructions stored in the memory device or instructions otherwise accessible to the processor 205. As such, whether configured by hardware or via instructions stored on a computer-readable storage medium, or by a combination thereof, the processor 205 may represent an entity capable of performing operations according to embodiments of the present invention while configured accordingly. Thus, for example, when the processor 205 is embodied as an ASIC, FPGA or the like, the processor 205 may be specifically configured hardware for conducting the operations described herein. Alternatively, when the processor 205 is embodied as an executor of instructions stored on a computer-readable storage medium, the instructions may specifically configure the processor 205 to perform the algorithms and operations described herein. However, in some cases, the processor 205 may be a processor of a specific device (e.g., a product display apparatus) configured for employing example embodiments of the present invention by further configuration of the processor 205 via executed instructions for performing the algorithms and operations described herein.

According to an embodiment of the present invention the processor 205 may be configured to detect a number of products removed from the storage area through the single unit retrieval opening within a monitor period, detect the number of products returned to the storage area through the single unit return opening, subtract the number of products returned from the number of products removed to determine a product count, and generate an alert upon the product count reaching a predetermined value. The processor may also be configured to set the product count to zero upon termination of the monitor period.

The aforementioned embodiment may be executed by the processor performing the steps outlined in the flow diagram of FIG. 15. The monitor period begins at step 700 and the processor determines if a product has been removed at step 710, and if so, adds to the number of product units removed at step 720. The processor then determines if a product has been returned at 730, and if so, adds to the number of products removed at step 740. The processor then increments a step towards the end of the monitor period at step 750. The processor determines if the monitor period has ended at step 760. If the monitor period has not ended, the processor returns to step 710 to determine if another product has been removed or returned. If the monitor period has ended, the processor may subtract the number of products returned from the number of products removed to determine a product count as shown at step 770. If the product count is greater than the predetermined value at step 780, an alert will be signaled at step 800. If the product count is not greater than the predetermined value, the products removed, products returned, and product count numbers will be reset at step 790 and the process will start over at step 700.

According to another embodiment of the present invention, the processor may be configured to detect a second number of products removed from the storage area through the single unit retrieval opening within a second monitor period, detect a second number of products returned to the storage area through the single unit return opening, subtract the number of products returned from the number of products removed to determine a second product count, and generate a second alert upon the second product count reaching the predetermined value. The second monitor period may at least partially overlap the monitor period.

Some embodiments of the present invention may include a recording device that records activity associated with the display apparatus to a memory in response to the alert. Portions of the memory associated with the alert may be identified for review by an operator.

The product display apparatus 100 may be in wired electrical or wireless communication with a controller 600 that may include a processor 205 for monitoring product displays as illustrated in FIG. 18. The controller 600 may be physically located on or within the product display apparatus 100 or may be located remotely. The processor 205 may be configured to detect a number of conditions at the product display 100 such as, but not limited to, a storage output or an out-of-stock condition, a rapid-removal condition, a door assembly open condition, and product display apparatus tampering. The processor 205 may also be configured to determine a number of products that have been removed during a monitor period or particular time-frame for purposes of inventory monitoring.

The processor 205 may also be configured to trigger an alert such as an audible alarm, a visible alarm (e.g., a blinking LED, etc.), a signal or message to a computer, pager, email, text-messaging system, audio or visual recording system (e.g., close circuit camera, etc.) or any combination thereof. In one embodiment, the alert may trigger a notification that appears on the screen of a cash register to alert store personnel to a condition associated with the product display apparatus. In another embodiment, if a recording system having a video surveillance camera is monitored within a retail store, the alert may trigger the camera to focus on the location of the alert (i.e., the location of the display apparatus initiating the alert) and may draw the attention of the monitoring staff by highlighting an associated surveillance monitor.

Embodiments of the present invention may generate an alert by detecting the withdrawal of a product from the storage area 129 through the single unit retrieval opening 116 and initiating a timer to proceed to a time-out value in response to detecting the product withdrawal. Upon detecting the withdrawal of a second product from the storage area 129 through the single unit retrieval opening 116 a counter may be incremented. Upon the counter reaching a predetermined value prior to the timer reaching the time-out value, an alert may be signaled. The predetermined value and the time-out value are numbers that may be set by the user of the product display system.

In another embodiment, generating an alert may further include the steps of detecting the return of a product to the storage area 129 through the return area 104 and decrementing the counter in response to detecting the return of a product. The timer may also be terminated when the counter is decremented to zero.

In still another embodiment of the present invention, generating an alert may further include the steps of initiating a second timer to proceed to a second time-out value in response to detecting the withdrawal of the second product from the storage area 129 through the single unit retrieval opening 116. Upon detecting the withdrawal of a third product, a second counter is incremented and an alert is signaled upon the second counter reaching a second predetermined value prior to the second timer reaching the second time-out value. While in one preferred embodiment the time-out value and the second time out value are equal, and the predetermined value and the second predetermined value are equal, it will be appreciated by one of ordinary skill in the art that these values (e.g., the time-out value and the second time-out value) may be different.

The method of generating an alert may also include recording activity associated with the product display apparatus to a memory using a recording device and identifying portions of the memory associated with the alert. Optionally, the method may comprise the step of activating a recording device to record activity associated with the product display apparatus in response to an alert. An alarm, such as any of the types identified above, may be activated in response to the alert.

FIG. 16 depicts a flow diagram for illustrating a method for generating an alert associated with a product display apparatus in accordance with one embodiment of the invention. The depicted method may be practiced by a processor executing computer readable instructions as will be apparent to one of skill in the art in view of this disclosure.

In the depicted embodiment, a processor detects a retrieval output from a product display at step 300, initiates a timer associated with the retrieval output at step 310, and initiates a counter associated with the retrieval output at step 320. If a second retrieval output is detected from the product display at step 350 before the first timer reaches the time-out value at step 330, the counter is incremented at step 360 to a value of two, indicating that two products have been removed. Subsequent retrieval outputs indicating product removals will similarly increment the counter at step 360 provided the timer has not previously reached the time-out value at step 330. If the counter reaches the predetermined value at step 380 before the timer reaches the timer time-out value at step 330, the alert is triggered at step 390 indicating a rapid-removal condition. If the timer reaches the user-defined time-out value at step 330 before the counter reached the user-defined predetermined value at step 380 the routine ends without signaling an alert.

The processor may be configured to initiate a new timer at step 310 and a new counter at step 320 with the detection of each retrieval output at step 300. In such a system, the timers would be allowed to at least partially overlap or run concurrently such that a rapid-product removal condition would always be detected provided a user-defined predetermined value number of products were removed within the time limit of the user-defined timer time-out value. An example of such user-defined values may be a predetermined value of 3 and a timer time-out value of 10 seconds, though any values may be used. The processor may be in communication with a controller that includes a user input, wherein the user input may be configured such that the predetermined value is user-selectable from a group of predetermined values, such as a range from 2 to 10 and the timer time-out value may be user selectable from a group of times, such as 5 seconds to 90 seconds in 5 second intervals.

The processor may further be configured to be in communication with a plurality of product displays, each including a retrieval detector. In such an embodiment, the processor may be configured to generate an alert for each individual product display and/or generate an alert for the plurality of product displays as a whole i.e., the total product display. For an embodiment that is configured to generate an alert for each individual product display, the processor may be configured as outlined above, and may be capable of simultaneously performing the method for generating an alert for each individual product display. To perform the method for generating an alert for the total product display, the processor may be configured to run a timer for the total product display while counting the retrieval output from any of the individual product displays. In such an embodiment, the controller may be configured with a total product display predetermined value and a total product display time-out value. The logic used may be the same as that illustrated in FIG. 16; however, any one of the retrieval outputs from any one of the plurality of product displays may initiate the total product display timer and increment the total product display counter. Thus, if the total product display counter reached the total product display predetermined value before the total product display timer reached the total product display time-out value, an alert would be generated for the total product display.

In another embodiment, instead of initiating a new timer in response to each retrieval output the processor may simply use a monitor period during which the processor tracks the numbers of products removed from the storage area during the monitor period. For example, the processor may track how many products are removed in rolling 5 second intervals (i.e., monitor periods). If the number of removed products during any one monitor period exceeds a predetermined value (e.g., 3 products), an alert may be triggered.

In another embodiment, the processor may be configured to determine a frequency associated with the receipt of the retrieval output (i.e., products removed per unit of time) such that the processor may generate an alert upon the frequency exceeding a predetermined value (e.g., 1.2 products/second).

FIG. 17 depicts a flow diagram illustrating a method for generating an alert associated with a product display apparatus in accordance with another embodiment of the invention. The method of FIG. 17 is similar to that depicted in FIG. 16 except that while the first timer is running at step 410, if a product is inserted into the return area at step 480 (i.e., the product is detected by the return detector), the first counter may be decremented at step 490 to reflect a return. Such a system may prevent a rapid-removal alert from occurring, for example, when five units are removed, but four units are returned while the timer is running provided the number of products removed minus the number of products returned does not exceed the predetermined value while the timer is running

EXAMPLE

FIG. 18 depicts a display system structured in accordance with one embodiment of the invention. The depicted display system includes a display structure 610 with a plurality of product displays 620. Each product display 620 is structured generally as described in FIGS. 1-3 and includes a retrieval detector (not shown) disposed proximate a single unit retrieval opening. The retrieval detectors of each product display 620 are disposed in communication with a controller 600 including a processor 205. The controller 600 may be configured to wirelessly transmit alert conditions from the processor 205 via a transmitter 630 to a receiver 640. The alarm device 650 may be configured to alert store personnel of a transmitted alert condition.

In the depicted embodiment, the controller 600 includes four settings that are adjustable by store personnel via a user interface (not shown) that is disposed in communication with the processor 205. The settings include: single product display predetermined value 601; single product display time-out value 602; total product display predetermined value 603; and total product display time-out value 604. The single product display predetermined value 601 refers to a predetermined number of products removed from the single unit retrieval opening of a single product display before the alert is signaled. The single product display time-out value 602 refers to a monitor period or time window during which an alert is signaled if the predetermined value 601 is reached. Similarly, the total product display predetermined value 603 refers to a predetermined number of products removed from the single unit retrieval openings of all of the product displays associated with the display structure before the alert is signaled. The total product display time-out value 604 is the monitor period or time window during which the total product display predetermined value 603 must be reached to signal an alert.

In various embodiments, each of the settings above may be separately adjusted at the user interface of the controller 600 and communicated to the processor 205. For example, the single product display predetermined value 601 may be two, while the single product display time-out value 602 may be five seconds. In this example, if two or more products are removed from the single unit retrieval opening of a single product display in less than five seconds, then an alert will be signaled. If the total product display predetermined value 603 is set to five and the total product display time-out value 604 is set to ten seconds, the removal of five products from any combination of product displays in ten seconds will cause the processor 205 to signal an alert.

The alert generated in the example above may initiate a signal sent wirelessly by a transmitter 630 that is in communication with the controller 600 to a receiver 640 in an alarm device 650 that is positioned at a monitor location near store personnel (e.g., a checkout or cash register location). Upon the alert being signaled, the store personnel may be notified by the alarm device so that they may respond to the condition causing the alert. As discussed above, the alarm device need not be a loud audible alarm and may be a subtle display that is only noticed by the employees such that the customer experience within the store is not negatively affected. Further, the subtle alert that is not heard or seen by customers ensures that well-meaning customers who might accidently trigger the alarm do not suffer undue embarrassment that may be associated with signaling a loud audible alarm.

In another embodiment, the alert transmitted by transmitter 630 may also be received by a recording system 660 such as a closed circuit television (CCTV) system. The depicted recording system includes video camera disposed in communication with a digital video recorder (DVR). In other embodiments, other memory devices may be used instead of the DVR such as a VHS tape recording device, a DVD recording device, or any other video recording device.

Returning to the depicted embodiment, when the alert is received by the DVR, the DVR may engage the camera to begin recording video of the environment surrounding the product supply module(s) associated with the alert, or if the DVR is already recording, the recorded video data may be bookmarked to identify portions of the video data associated with the alert for subsequent review, analysis, and/or cataloging.

Many modifications and other embodiments of the invention set forth herein will come to mind to one skilled in the art to which this invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A display apparatus comprising:
   a product storage area configured to store products such that the products are accessible by customers to withdraw the products from the product storage area for purchase;
   a retrieval detector positioned proximate the product storage area, the retrieval detector configured to generate a retrieval output in response to a product being withdrawn from the product storage area; and
   a processor in communication with the retrieval detector, the processor being configured to:
      receive the retrieval output from the retrieval detector;
      initiate a timer and a counter upon receiving the retrieval output, wherein the processor increments the counter upon receipt of a second retrieval output;
      determine a frequency that the products are being removed from the product storage area per unit time; and
      generate an alert upon the frequency exceeding a predetermined value.

2. The display apparatus of claim 1, wherein the retrieval detector is configured to generate a storage output when the product storage area is empty.

3. The display apparatus of claim 1, wherein the processor is further configured to determine a frequency that products are being removed from the product storage area per unit time; and generate an alert upon the frequency exceeding a predetermined value.

4. The display apparatus of claim 1, wherein the product storage area is further configured to receive a plurality of the products arranged adjacent to each other.

5. The display apparatus of claim 1, wherein the processor is configured to communicate the quantity of products stored in the product storage area to a remote device to enable a comparison of products sold, to products removed from, the product storage area.

6. The display apparatus of claim 1, wherein the processor is configured to communicate with a security system to enable activation of a security system asset in response to communications with the detector.

7. The display apparatus of claim 1, wherein the processor is further configured to count a second number of products withdrawn before a second timer reaches a second time-out value.

8. The display apparatus of claim 7, wherein the first timer and the second timer run during times that at least partially overlap.

9. A display apparatus comprising:
a product storage area configured to store products for sale to customers;
a detector configured to monitor the product storage area, wherein being configured to monitor the product storage area includes being configured to detect an insertion of products into the product storage area and detect retrieval of products from the product storage area; and
a processor in communication with the detector, the processor being configured to determine a quantity of products stored in the product storage area based on the monitoring performed by the detector, and counter a number of products withdrawn before a first timer reaches a first time-out value.

10. The display apparatus of claim 9, wherein the processor is configured to provide an output based on the quantity of products determined to be stored in the product storage area.

11. The display apparatus of claim 10, wherein the output comprises an alert indicating that the quantity of products is below a threshold value.

12. The display apparatus of claim 10, wherein the output comprises an alert indicating that all products have been removed from the product storage area.

13. The display apparatus of claim 9, wherein the processor is further configured to determine a frequency that products are being removed from the product storage area per unit time; and generate an alert upon the frequency exceeding a predetermined value.

14. The display apparatus of claim 9, wherein being configured to determine the quantity of products includes the processor being configured to:
determine a number of products removed from the product storage area;
determining a number of products returned to the product storage area; and
determine a difference between the number of products removed and the number of products returned, the difference representing the quantity of products.

15. The display apparatus of claim 9, wherein being configured to determine the quantity of products includes the processor being configured to determine a change in the quantity of products within a defined time period.

16. The display apparatus of claim 9, wherein the product storage area is further configured to receive a plurality of the products arranged adjacent to each other.

17. The display apparatus of claim 9, wherein the processor is configured to communicate the quantity of products stored in the product storage area to a remote device to enable a comparison of products sold to products removed from the product storage area.

18. The display apparatus of claim 9, wherein the processor is configured to communicate with a security system to enable activation of a security system asset in response to communications with the detector.

19. The display apparatus of claim 9, wherein the processor is further configured to count a second number of products withdrawn before a second timer reaches a second time-out value.

20. The display apparatus of claim 19, wherein the first timer and the second timer run during times that at least partially overlap.

21. The display apparatus of claim 9, wherein the processor is further configured to generate an alert based on a comparison of the number of products withdrawn before the second timer reaches the second time-out value to a predetermined value.

* * * * *